(12) United States Patent
Kilger et al.

(10) Patent No.: US 8,301,574 B2
(45) Date of Patent: Oct. 30, 2012

(54) MULTIMEDIA ENGAGEMENT STUDY

(75) Inventors: Max Kilger, Boca Raton, FL (US); John Alfred Fetto, Jr., New York, NY (US); David Algranati, Rahway, NJ (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 1102 days.

(21) Appl. No.: 11/856,628

(22) Filed: Sep. 17, 2007

(65) Prior Publication Data

US 2009/0076883 A1 Mar. 19, 2009

(51) Int. Cl.
*G06Q 10/00* (2012.01)
(52) U.S. Cl. ....... 705/306; 705/1.1; 705/7.38; 705/7.39; 705/7.41; 707/600
(58) Field of Classification Search ................... 705/306
See application file for complete search history.

(56) References Cited

U.S. PATENT DOCUMENTS

| | | |
|---|---|---|
| 4,775,935 A | 10/1988 | Yourick |
| 4,827,508 A | 5/1989 | Shear |
| 4,868,570 A | 9/1989 | Davis |
| 4,872,113 A | 10/1989 | Dinerstein |
| 4,935,870 A | 6/1990 | Burk, Jr. et al. |
| 4,982,346 A | 1/1991 | Girouard et al. |
| 5,056,019 A | 10/1991 | Schultz et al. |
| 5,201,010 A | 4/1993 | Deaton et al. |
| 5,247,575 A | 9/1993 | Sprague et al. |
| 5,274,547 A | 12/1993 | Zoffel et al. |
| 5,283,731 A | 2/1994 | Lalonde et al. |
| 5,305,195 A | 4/1994 | Murphy |
| 5,325,509 A | 6/1994 | Lautzenheiser |
| 5,341,429 A | 8/1994 | Stringer et al. |
| 5,459,306 A | 10/1995 | Stein et al. |
| 5,515,098 A | 5/1996 | Carles |
| 5,521,813 A | 5/1996 | Fox et al. |
| 5,528,701 A | 6/1996 | Aref |
| 5,555,409 A | 9/1996 | Leenstra, Sr. et al. |
| 5,583,763 A | 12/1996 | Atcheson et al. |
| 5,592,560 A | 1/1997 | Deaton et al. |
| 5,640,551 A | 6/1997 | Chu et al. |
| 5,655,129 A | 8/1997 | Ito |

(Continued)

FOREIGN PATENT DOCUMENTS

EP 0 749 081 A1 12/1966

(Continued)

OTHER PUBLICATIONS

U.S. Appl. No. 12/220,320, filed Jul. 23, 2008, Olof et al.

(Continued)

*Primary Examiner* — James A Reagan
(74) *Attorney, Agent, or Firm* — Knobbe Martens Olson & Bear LLP

(57) ABSTRACT

A media engagement system determines engagement scores for media vehicles across multiple media channels. The engagements scores for a media vehicle comprise multiple dimension scores indicating various aspects of engagement for that particular media vehicle. The dimension scores may be related to inspirational, trustworthy, life enhancing, social interaction, personal timeout, and ad attention/receptivity engagement dimensions, for example. The dimensions scores associated with respective engagement dimensions are based on responses to specific statements in engagement surveys completed by multiple media consumers. Thus, each statement in the engagement survey is associated with at least one engagement dimension and the engagement dimension score is then calculated based on media consumer responses to the statements associated with the respective engagement dimension.

15 Claims, 14 Drawing Sheets

U.S. PATENT DOCUMENTS

| | | |
|---|---|---|
| 5,659,731 A | 8/1997 | Gustafson |
| 5,661,516 A | 8/1997 | Carles |
| 5,666,528 A | 9/1997 | Thai |
| 5,692,107 A | 11/1997 | Simoudis et al. |
| 5,696,907 A | 12/1997 | Tom |
| 5,737,732 A | 4/1998 | Gibson et al. |
| 5,740,549 A | 4/1998 | Reilly et al. |
| 5,754,938 A | 5/1998 | Herz et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,802,142 A | 9/1998 | Browne |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,835,915 A | 11/1998 | Carr et al. |
| 5,848,396 A | 12/1998 | Gerace |
| 5,857,175 A | 1/1999 | Day et al. |
| 5,873,068 A | 2/1999 | Beaumont et al. |
| 5,881,131 A | 3/1999 | Farris et al. |
| 5,884,287 A | 3/1999 | Edesess |
| 5,905,985 A | 5/1999 | Malloy et al. |
| 5,926,800 A | 7/1999 | Baronowski et al. |
| 5,933,813 A | 8/1999 | Teicher et al. |
| 5,944,790 A | 8/1999 | Levy |
| 5,953,707 A | 9/1999 | Huang et al. |
| 5,963,932 A | 10/1999 | Jakobsson et al. |
| 5,974,396 A | 10/1999 | Anderson et al. |
| 5,991,735 A | 11/1999 | Gerace |
| 6,018,723 A | 1/2000 | Siegel et al. |
| 6,044,357 A | 3/2000 | Garg |
| 6,070,147 A | 5/2000 | Harms et al. |
| 6,073,140 A | 6/2000 | Morgan et al. |
| 6,101,486 A | 8/2000 | Roberts et al. |
| 6,119,103 A | 9/2000 | Basch et al. |
| 6,121,901 A | 9/2000 | Welch et al. |
| 6,128,624 A | 10/2000 | Papierniak et al. |
| 6,144,948 A | 11/2000 | Walker et al. |
| 6,144,957 A | 11/2000 | Cohen et al. |
| 6,151,601 A | 11/2000 | Papierniak et al. |
| 6,182,060 B1 | 1/2001 | Hedgcock et al. |
| 6,208,979 B1 | 3/2001 | Sinclair |
| 6,223,171 B1 | 4/2001 | Chaudhuri et al. |
| 6,236,977 B1 | 5/2001 | Verba et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,269,325 B1 | 7/2001 | Lee et al. |
| 6,289,318 B1 | 9/2001 | Barber |
| 6,298,330 B1 | 10/2001 | Gardenswartz et al. |
| 6,304,869 B1 | 10/2001 | Moore et al. |
| 6,317,752 B1 | 11/2001 | Lee et al. |
| 6,321,205 B1 | 11/2001 | Eder |
| 6,324,566 B1 | 11/2001 | Himmel et al. |
| 6,330,546 B1 | 12/2001 | Gopinathan et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,385,592 B1 | 5/2002 | Angles et al. |
| 6,393,406 B1 | 5/2002 | Eder |
| 6,430,539 B1 | 8/2002 | Lazarus et al. |
| 6,442,577 B1 | 8/2002 | Britton et al. |
| 6,460,036 B1 | 10/2002 | Herz |
| 6,496,819 B1 | 12/2002 | Bello et al. |
| 6,505,176 B2 | 1/2003 | DeFrancesco, Jr. et al. |
| 6,513,018 B1 | 1/2003 | Culhane |
| 6,523,022 B1 | 2/2003 | Hobbs |
| 6,523,041 B1 | 2/2003 | Morgan et al. |
| 6,542,894 B1 | 4/2003 | Lee et al. |
| 6,574,623 B1 | 6/2003 | Laung et al. |
| 6,597,775 B2 | 7/2003 | Lawyer et al. |
| 6,598,030 B1 | 7/2003 | Siegel et al. |
| 6,615,247 B1 | 9/2003 | Murphy |
| 6,623,529 B1 | 9/2003 | Lakritz |
| 6,631,496 B1 | 10/2003 | Li et al. |
| 6,640,215 B1 | 10/2003 | Galperin et al. |
| 6,651,220 B1 | 11/2003 | Penteroudakis et al. |
| 6,665,715 B1 | 12/2003 | Houri |
| 6,757,740 B1 | 6/2004 | Parekh et al. |
| 6,766,327 B2 | 7/2004 | Morgan, Jr. et al. |
| 6,782,390 B2 | 8/2004 | Lee et al. |
| 6,804,701 B2 | 10/2004 | Muret et al. |
| 6,810,356 B1 | 10/2004 | Garcia-Franco et al. |
| 6,823,319 B1 | 11/2004 | Lynch et al. |
| 6,839,682 B1 | 1/2005 | Blume et al. |
| 6,850,606 B2 | 2/2005 | Lawyer et al. |
| 6,873,979 B2 | 3/2005 | Fishman et al. |
| 6,901,406 B2 | 5/2005 | Nabe et al. |
| 6,925,441 B1 | 8/2005 | Jones, III et al. |
| 6,959,281 B1 | 10/2005 | Freeling et al. |
| 6,983,379 B1 | 1/2006 | Spalink et al. |
| 6,983,478 B1 | 1/2006 | Grauch et al. |
| 6,993,493 B1 | 1/2006 | Galperin et al. |
| 7,003,504 B1 | 2/2006 | Angus et al. |
| 7,003,792 B1 | 2/2006 | Yuen |
| 7,028,052 B2 | 4/2006 | Chapman et al. |
| 7,033,792 B2 | 4/2006 | Zhong et al. |
| 7,072,853 B2 | 7/2006 | Shkedi |
| 7,072,963 B2 | 7/2006 | Anderson et al. |
| 7,082,435 B1 | 7/2006 | Guzman et al. |
| 7,139,734 B2 | 11/2006 | Nathans et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,185,016 B1 | 2/2007 | Rasmussen |
| 7,185,353 B2 | 2/2007 | Schlack |
| 7,200,602 B2 | 4/2007 | Jonas |
| 7,240,059 B2 | 7/2007 | Bayliss et al. |
| 7,275,083 B1 | 9/2007 | Seibel et al. |
| 7,277,900 B1 | 10/2007 | Ganesh et al. |
| 7,360,251 B2 | 4/2008 | Spalink et al. |
| 7,366,694 B2 | 4/2008 | Lazerson |
| 7,370,044 B2 | 5/2008 | Mulhern et al. |
| 7,383,215 B1 | 6/2008 | Navarro et al. |
| 7,403,942 B1 | 7/2008 | Bayliss |
| 7,428,509 B2 | 9/2008 | Klebanoff |
| 7,433,855 B2 | 10/2008 | Gavan et al. |
| 7,467,127 B1 | 12/2008 | Baccash |
| 7,472,088 B2 | 12/2008 | Taylor et al. |
| 7,499,868 B2 | 3/2009 | Galperin et al. |
| 7,546,619 B2 | 6/2009 | Anderson et al. |
| 7,556,192 B2 | 7/2009 | Wokaty, Jr. |
| 7,571,139 B1 | 8/2009 | Giordano et al. |
| 7,580,856 B1 | 8/2009 | Pliha |
| 7,590,589 B2 | 9/2009 | Hoffberg |
| 7,610,257 B1 | 10/2009 | Abrahams |
| 7,653,592 B1 | 1/2010 | Flaxman |
| 7,653,593 B2 | 1/2010 | Zarikian et al. |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,698,236 B2 | 4/2010 | Cox et al. |
| 7,730,509 B2 | 6/2010 | Boulet et al. |
| 7,877,322 B2 | 1/2011 | Nathans et al. |
| 7,904,366 B2 | 3/2011 | Pogust |
| 2001/0037332 A1 | 11/2001 | Miller et al. |
| 2001/0049620 A1 | 12/2001 | Blasko |
| 2002/0023051 A1 | 2/2002 | Kunzle et al. |
| 2002/0026411 A1 | 2/2002 | Nathans et al. |
| 2002/0029162 A1* | 3/2002 | Mascarenhas ................ 705/10 |
| 2002/0046099 A1 | 4/2002 | Frengut et al. |
| 2002/0049968 A1 | 4/2002 | Wilson et al. |
| 2002/0072927 A1 | 6/2002 | Phelan et al. |
| 2002/0077964 A1 | 6/2002 | Brody et al. |
| 2002/0123904 A1 | 9/2002 | Amengual et al. |
| 2002/0128960 A1 | 9/2002 | Lambiotte et al. |
| 2002/0129368 A1 | 9/2002 | Schlack et al. |
| 2002/0133404 A1 | 9/2002 | Pedersen |
| 2002/0138297 A1 | 9/2002 | Lee |
| 2002/0147695 A1 | 10/2002 | Khedkar et al. |
| 2002/0173984 A1 | 11/2002 | Robertson et al. |
| 2002/0184255 A1 | 12/2002 | Edd et al. |
| 2002/0194103 A1 | 12/2002 | Nabe |
| 2003/0018549 A1 | 1/2003 | Fei et al. |

| | | |
|---|---|---|
| 2003/0033242 A1 | 2/2003 | Lynch et al. |
| 2003/0036996 A1 | 2/2003 | Lazerson |
| 2003/0065563 A1 | 4/2003 | Elliott et al. |
| 2003/0083893 A1 | 5/2003 | Aliffi et al. |
| 2003/0093289 A1 | 5/2003 | Thornley et al. |
| 2003/0097329 A1 | 5/2003 | Nabe et al. |
| 2003/0097380 A1 | 5/2003 | Mulhern et al. |
| 2003/0171942 A1 | 9/2003 | Gaito |
| 2003/0195830 A1 | 10/2003 | Merkoulovitch et al. |
| 2003/0208362 A1 | 11/2003 | Enthoven et al. |
| 2003/0212618 A1 | 11/2003 | Keyes et al. |
| 2003/0216965 A1 | 11/2003 | Libman |
| 2003/0217003 A1 | 11/2003 | Weinflash et al. |
| 2003/0233323 A1 | 12/2003 | Bilski et al. |
| 2004/0030667 A1 | 2/2004 | Xu et al. |
| 2004/0039686 A1 | 2/2004 | Klebanoff |
| 2004/0044615 A1 | 3/2004 | Xue et al. |
| 2004/0044617 A1 | 3/2004 | Lu |
| 2004/0078809 A1 | 4/2004 | Drazin |
| 2004/0107125 A1 | 6/2004 | Guheen et al. |
| 2004/0111363 A1 | 6/2004 | Trench et al. |
| 2004/0122730 A1 | 6/2004 | Tucciarone et al. |
| 2004/0122735 A1 | 6/2004 | Meshkin |
| 2004/0139025 A1 | 7/2004 | Coleman |
| 2004/0153448 A1 | 8/2004 | Cheng et al. |
| 2004/0163101 A1 | 8/2004 | Swix |
| 2004/0177030 A1 | 9/2004 | Shoham |
| 2004/0186807 A1 | 9/2004 | Nathans et al. |
| 2004/0193535 A1 | 9/2004 | Barazesh |
| 2004/0199584 A1 | 10/2004 | Kirshenbaum et al. |
| 2004/0205157 A1 | 10/2004 | Bibelnieks et al. |
| 2004/0220896 A1 | 11/2004 | Fei et al. |
| 2004/0225596 A1 | 11/2004 | Kemper et al. |
| 2004/0243588 A1 | 12/2004 | Tanner et al. |
| 2005/0004805 A1 | 1/2005 | Srinivasan |
| 2005/0021397 A1 | 1/2005 | Cui et al. |
| 2005/0027632 A1 | 2/2005 | Zeitoun et al. |
| 2005/0027633 A1 | 2/2005 | Fortuna et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0144067 A1 | 6/2005 | Farahat et al. |
| 2005/0154664 A1 | 7/2005 | Guy et al. |
| 2005/0209922 A1 | 9/2005 | Hofmeister |
| 2005/0222906 A1 | 10/2005 | Chen |
| 2005/0251820 A1 | 11/2005 | Stefanik et al. |
| 2005/0278246 A1 | 12/2005 | Friedman et al. |
| 2005/0278743 A1 | 12/2005 | Flickinger et al. |
| 2005/0279824 A1 | 12/2005 | Anderson et al. |
| 2005/0288954 A1 | 12/2005 | McCarthy et al. |
| 2006/0004731 A1 | 1/2006 | Seibel et al. |
| 2006/0041443 A1 | 2/2006 | Horvath |
| 2006/0059073 A1 | 3/2006 | Walzak |
| 2006/0080233 A1 | 4/2006 | Mendelovich et al. |
| 2006/0080251 A1 | 4/2006 | Fried et al. |
| 2006/0129428 A1 | 6/2006 | Wennberg |
| 2006/0178971 A1 | 8/2006 | Owen et al. |
| 2006/0184440 A1 | 8/2006 | Britti et al. |
| 2006/0206379 A1 | 9/2006 | Rosenberg |
| 2006/0212353 A1 | 9/2006 | Roslov et al. |
| 2006/0224696 A1 | 10/2006 | King et al. |
| 2006/0229943 A1 | 10/2006 | Mathias et al. |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0022032 A1 | 1/2007 | Anderson et al. |
| 2007/0022297 A1 | 1/2007 | Britti et al. |
| 2007/0038497 A1 | 2/2007 | Britti et al. |
| 2007/0055618 A1 | 3/2007 | Pogust |
| 2007/0055621 A1 | 3/2007 | Tischler et al. |
| 2007/0061195 A1 | 3/2007 | Liu et al. |
| 2007/0061243 A1 | 3/2007 | Ramer et al. |
| 2007/0067235 A1 | 3/2007 | Nathans et al. |
| 2007/0067297 A1 | 3/2007 | Kublickis |
| 2007/0078835 A1 | 4/2007 | Donnelli |
| 2007/0106582 A1 | 5/2007 | Baker et al. |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0214076 A1 | 9/2007 | Robida et al. |
| 2007/0226093 A1 | 9/2007 | Chan et al. |
| 2007/0226130 A1 | 9/2007 | Haggerty et al. |
| 2007/0233857 A1 | 10/2007 | Cheng et al. |
| 2007/0244732 A1 | 10/2007 | Chatterji et al. |
| 2007/0282684 A1* | 12/2007 | Prosser et al. ................... 705/14 |
| 2007/0288271 A1 | 12/2007 | Klinkhammer |
| 2007/0288950 A1 | 12/2007 | Downey et al. |
| 2007/0288953 A1 | 12/2007 | Sheeman et al. |
| 2008/0005313 A1 | 1/2008 | Flake et al. |
| 2008/0010206 A1 | 1/2008 | Coleman |
| 2008/0027859 A1 | 1/2008 | Nathans et al. |
| 2008/0028067 A1 | 1/2008 | Berkhin et al. |
| 2008/0059317 A1 | 3/2008 | Chandran et al. |
| 2008/0110973 A1 | 5/2008 | Nathans et al. |
| 2008/0120155 A1 | 5/2008 | Pliha |
| 2008/0177836 A1* | 7/2008 | Bennett ........................ 709/205 |
| 2008/0184289 A1 | 7/2008 | Cristofalo et al. |
| 2008/0228635 A1 | 9/2008 | Megdal et al. |
| 2008/0255897 A1 | 10/2008 | Megdal et al. |
| 2008/0294540 A1 | 11/2008 | Celka et al. |
| 2008/0301727 A1 | 12/2008 | Cristofalo et al. |
| 2009/0018996 A1 | 1/2009 | Hunt et al. |
| 2009/0044246 A1 | 2/2009 | Sheehan et al. |
| 2009/0044279 A1 | 2/2009 | Crawford et al. |
| 2009/0094640 A1 | 4/2009 | Anderson et al. |
| 2009/0133058 A1 | 5/2009 | Kouritzin et al. |
| 2009/0198612 A1 | 8/2009 | Meimes et al. |
| 2009/0222308 A1 | 9/2009 | Zoldi et al. |
| 2009/0288109 A1 | 11/2009 | Downey et al. |
| 2010/0037255 A1 | 2/2010 | Sheehan et al. |
| 2010/0138290 A1 | 6/2010 | Zschocke et al. |
| 2010/0145836 A1 | 6/2010 | Baker et al. |
| 2010/0145847 A1 | 6/2010 | Zarikian et al. |

FOREIGN PATENT DOCUMENTS

| | | |
|---|---|---|
| EP | 0419889 A2 | 4/1991 |
| EP | 0458698 A | 11/1991 |
| EP | 0559358 | 9/1993 |
| EP | 0977128 | 2/2000 |
| EP | 1122664 | 8/2001 |
| EP | 0772836 | 12/2001 |
| JP | 2003-016261 | 1/2003 |
| TW | 256569 | 6/2006 |
| WO | WO 95/34155 | 12/1995 |
| WO | WO 96/00945 | 1/1996 |
| WO | WO 97/23838 | 7/1997 |
| WO | WO 98/41931 | 9/1998 |
| WO | WO 98/41932 | 9/1998 |
| WO | WO 98/41933 | 9/1998 |
| WO | WO 99/04350 | 1/1999 |
| WO | WO 99/17225 | 4/1999 |
| WO | WO 99/17226 | 4/1999 |
| WO | WO 99/22328 | 5/1999 |
| WO | WO 99/38094 | 7/1999 |
| WO | WO 99/46710 | 9/1999 |
| WO | WO 00/04465 | 1/2000 |
| WO | WO 00/28441 | 5/2000 |
| WO | WO 01/25896 | 4/2001 |
| WO | WO 01/75754 | 10/2001 |
| WO | WO 03/101123 | 12/2003 |
| WO | WO 2007/149941 | 12/2007 |

OTHER PUBLICATIONS

U.S. Appl. No. 12/705,489, filed Feb. 12, 2010, Bargoli et al.

U.S. Appl. No. 12/705,511, filed Feb. 12, 2010, Bargoli et al.

"Atlas on Demand, Concurrent, and Everstream Strike Video-On-Demand Advertising Alliance", ATLASSOLUTIONS.COM, Jul. 13, 2006, 3 pages.

"Epsilon Leads Discussion on Paradigm Shift in TV Advertising," EPSILON.COM, Jun. 24, 2004, 2 pages, http://www.epsilon.com/who-pr_tvad040624.html.

"IRI and Acxiom Introduce More Efficient and Actionable Approach to Consumer Segmentation and Targeted Marketing," EU-MARKETINGPORTAL.DE, Jan. 26, 2006, 2 pages, http://www.eu-marketingportal.de.

"Accenture Completes Acquisition of Media Audits: Acquisition Expands Company's Marketing Sciences and Data Services Capabilities," ACCENTURE.COM, Dec. 12, 2005, 2 pages, http://accenture.tekgroup.com/article_display.cfm?article_id=4282.

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.

"Arbitron 2006 Black Consumers," Arbitron Inc., LVTSG.COM, Jul. 8, 2006, 2 pages, http://www.lvtsg.com/news/publish/Factoids/article_3648.shtml.

"Atlas on Demand and C-COR Join Forces to Offer Advertising Management Solution for on Demand TV: Global Provider of on Demand Systems Partners with Atlas to Develop and Market Comprehensive VOD Advertising Solution," ATLASSOLUTIONS.COM, Jul. 25, 2005, 3 pages.

Atlas on Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar Jun. 22, 2006—3 pages, http://www.atlassolutions.com/news_20060622.aspx.

"Cable Solution Now, The Industry Standard for Information Management: Strata's TIM.net Crosses Important Threshold Dominant Solution for All Top 20 TV Markets," STRATAG.COM, Apr. 28, 2006, 1 page, http://stratag.com/news/cablepress042806.html.

"Claritas Forms Life Insurance Consortium with Worldwide Financial Services Association: Initiative with LIMRA International is First of its Kind to Provide Actual Sales Information at Small Geographic Areas," CLARITAS.COM, Feb. 9, 2006, 3 pages, http.

"Claritas Introduces PRIZM NE Consumer Electronic Monitor Profiles: New Information Product Provides Insight Into the Public's Purchasing Behaviors of Consumer Electronics," CLARITAS.COM May 30, 2006, 3 pages.

Information Resources, Inc. and Navic Networks Form Joint Relationship to Support Next Generation of Technology for Advertising Testing, IRI Expands BehaviorScan® Solution to Meet Digital and On-demand Needs, INFORES.COM, Feb. 27, 2006, 2 pages, http://us.infores.com/page/news/pr/prearchive?mode=single&pr_id=117.

"Mediamark Research Inc. Releases Findings From Mobile Marketing Consumer Study; Outback Steakhouse and Royal Caribbean Cruise Lines Among Brands Participating in Mobile Marketing Research," THEFREELIBRARY.COM, May 9, 2006, 4 pages, http://thefreelibrary.com.

"SRC Announces Free Dashups to Mashups Adding Geographic Business Intelligence at Web Speed to the Enterprise on www.FreeDemographics.com/API," DIRECTIONSMAG.COM, Jun. 12, 2006, 3 pages, http://www.directionsmag.com/press.releases/index.php?duty=Show&id=14532&trv=1.

"SRC Delivers Industry's First Drive Time Engine Developed to Follow Actual Road Networks," THOMASNET.COM, May 21, 2006, 4 pages, http://news.thomasnet.com/companystory/485722.

"VOD Integration Now Available in Strata: Buyers / Sellers Benefit from VOD Component on Popular Platform," STRATAG.COM, Feb. 21, 2006, 1 page, http://www.stratag.com/news/mediapress022106.html.

Adweek, "Aim High: Ad Targeting Moves to the Next Level," dated Jan. 21, 2008 as downloaded from http://www.adweek.com/aw/magazine/article_display.isp?vnu on Apr. 16, 2008.

Adzilla, Press Release, "ZILLACASTING technology approved and patent pending," dated May 16, 2005 as downloaded from http://www.adzilla.com/newsroom/pdf/patent_051605.pdf on May 28, 2008.

AFX New Limited—AFX International Focus, "Nielsen moving to measure off-TV viewing," Jun. 14, 2006, 1 page.

Andrew Reinbach, MCIF aids banks in CRA compliance, Bank Systems & Technology, vol. 32, No. 8, pp. 27, Aug. 1995.

Bachman, Katy, "Arbitron, VNU Launch Apollo Project," MEDIAWEEK.COM Jan. 17, 2006, 3 pages, http://www.mediaweek.com/mw/search/article_display.jsp?schema=&vnu_content_id=1001847353.

Bult, Jan Roelf et al., Optimal Selection for Direct Mail, Marketing Science, vol. 14, No. 4 (1995), p. 378-94.

Burr Ph.D., Sara et al., "Utility Payments as Alternative Credit Data: A Reality Check", Asset Builders of America, Inc.

Click Z, "ISPs Collect User Data for Behavioral Ad Targeting," dated Jan. 3, 2008 as downloaded from http://www.clickz.com/showPage.html?page=clickz on Apr. 16, 2008.

CNET NEWS.COM, "Target me with your ads, please," dated Dec. 5, 2007 as downloaded from http://www.news.com/2102-1024_3-6221241.html?tag+st.util.print on Mar. 18, 2008.

Cowie, Norman E., Warning Bells & "The Bust-Out", Business Credit, Jul. 1, 2000.

Creamer, Matthew, "Consulting in marketing; Accenture, others playing role in firms' processes," Crain's Chicago Business, Jun. 12, 2006, 2 pages, Crain Communications.

Data and Decisioning, EFD eFunds Corporation, http://www.efunds.com/web/industry-solutions/financial-services/fr, printed Apr. 1, 2007 in 1 page.

Delany, Kevin J., et al. Firm Mines Offline Data to Target Online Ads; Commercial Alert Oct. 17, 2007; as downloaded from http://www.commercialalert.org on Apr. 22, 2008.

DEMOGRAPHICSNOW.COM, sample reports, "Age Rank Report", Jul. 17, 2006, 3 pages.

DEMOGRAPHICSNOW.COM, sample reports, "Consumer Expenditure Summary Report", Jul. 17, 2006, 3 pages.

DEMOGRAPHICSNOW.COM, sample reports, "Income Comparison Report", Jul. 17, 2006, 4 pages.

Dominique Haughton et al., "Direct Marketing Modeling with CART and CHAID", Journal of Direct Marketing, vol. 11, No. 4, Fall 1997.

Elmasri et al., "Fundamentals of Database Systems, Third Edition (Excerpts)," Jun. 2000, pp. 253, 261, 268-270, 278-280, 585, 595.

Fair Isaac Introduces Falcon One System to Combat Fraud, Business Wire, May 5, 2005.

Fair Isaac Offers New Fraud Tool, National Mortgage News & Source Media, Inc., Jun. 13, 2005.

Front Porch Brochure, "Ad Networks—Partner with Front Porch!: Our Internet-Wide Behavioral Targeting Brings Ad Networks Higher Revenue", 2 pages (Publication date unknown, copyright date is 2008).

Front Porch Brochure, "New Free Revenue for Broadband ISPs!: Get your share of the $20 billion online advertising market!", 2 pages (Publication date is unknown, copyright date is 2008).

Fusun Gonul et al., "Optimal Mailing of Catalogs: A New Methodology Using Estimable Structural Dynamic Programming Models", 14 pages, Management Science, vol. 44, No. 9, Sep. 1998.

Gabriel Bitran et al., "Mailing Decisions in Catalog Sales Industry", Management Science, vol. 42, No. 9, Sep. 1996, pp. 1364-1381.

GR Bitran, SV Mondschein—Management Science, 1996—JSTOR Mailing Decisions in the Catalog Sales Industry, Gabriel R. Bitram, Susana V. Mondschein. Management Sciencem vol. 42, No. 9, 1364-81, Sep. 1996.

Hakan Polatoglua and Izzet Sahinb, Probability distributions of cost, revenue and profit over a warranty cycle, European Journal of Operational Research, vol. 108, Issue 1. Jul. 1, 1998, p. 170-83.

Halliday, Jean, "Ford recruits Accenture for marketing plan," Automotive News Feb. 13, 2006, 2 pages, Crain Communications.

Helm, Burt, "Nielsen's New Ratings Yardstick," BUSINESSWEEK.COM, Jun. 20, 2006, 3 pages, http://www.businessweek.com/technology/content/jun2006/tc20060620_054223.htm.

Hinman, Donald P., "The Perfect Storm: Response Metrics and Digital TV," CHIEFMARKETER.COM, May 17, 2006, 2 pages, http://www.chiefmarketer.com/crm_loop/roi/perfect-storm-051706/index.html.

International Preliminary Report on Patentability and Written Opinion, PCT/US2008/064594, dated Oct. 8, 2008.

International Search Report and Written Opinion for PCT/US 08/83939, filed on Nov. 18, 2008, in 12 pages.

International Search Report and Written Opinion for PCT/US2007/63822, Sep. 11, 2007.
International Search Report and Written Opinion for PCT/US2007/63823, Oct. 24, 2007.
International Search Report and Written Opinion for PCT/US2007/63824, Oct. 9, 2007.
International Search Report and Written Opinion in PCT Application No. PCT/US2007/21815; Dated Sep. 5, 2008 in 11 pages.
International Search Report for PCT/US2007/06070, Nov. 10, 2008.
Katy Jacob et al., The Center for Financial Services Innovation, A Case Study of Checking Account Inquiries and Closures in Chicago, Nov. 2006.
Klein, "A Constant-Utility Index of the Cost of Living", The Review of Economic Studies, 1960, pp. 84-87, vol. XV-XVI, Kraus Reprint Corporation, New York.
Klein, L.R. & Goldberger, A.S. (1955) An Econometric Model of the United States: 1929-1952, Amsterdam: North-Holland.
Klein, L.R. (1946) The Keynesian Revolution, New York: MacMillan.
Lars Muus et al., "A decision theoretic framework for profit maximization in direct marketing", 20 pages, Sep. 1996.
NebuAD, Wall Street Journal Online, "Venture Capital: What's New", Oct. 22, 2007, 2 pages, http://www.nebuad.com/company/media_coverage/media_10_22_07.php.
Phorm, Press Release Regarding Exclusive Agreements, 2 pages, Feb. 14, 2008, http://www.phorm.com/about/launch_agreement.php.
Phorm, The Open Internet Exchange, http://www.phorm.com/oix/, printed Apr. 16, 2008, in 2 pages.
Pieter Otter et al., "Direct mail selection by joint modeling of the probability and quantity of response", 14 pages, Jun. 1997.
Predictive Behavioral Targeting as downloaded from http://www.predictive-behavioral-targeting.com/index.php.Main_Page on Mar. 28, 2008.
Rap Interactive, Inc. and Web Decisions, "LiveDecisions", 2 pages, Publication date unknown.
Rodgers, Zachary, ISPs Collect User Data for Behavioral Ad Targeting, ClickZ, Jan. 3, 2008, www.clickz.com/showPage.html?page=clickz, in 3 pages.
Schmittlein, David C. et al., Customer Base Analysis: An Industrial Purchase Process Application, Marketing Science, vol. 13, No. 1 (Winter 1994), p. 41-67.
Service Objects: Insight on Demand, Instant Contact Analysis and Lead Verification Solutions, DOTS Web Services—Product Directory, downloaded from www.serviceobjects.com/products/directory_of_web_services.asp, printed Mar. 8, 2011 in 3 pages.
Smith, Wendell R., "Product Differentiation and Market Segmentation as Alternative Marketing Strategies", The Journal of Marketing, Jul. 1956, pp. 3-8, vol. XXI, The American Marketing Association, Brattleboro, Vermont, U.S.A.
Stein, Benchmarking Default Prediction Models: Pitfalls and Remedies in Model Validation, Moody's KMV, Revised Jun. 13, 2002, Technical Report #020305; New York.
Stone, "Linear Expenditure Systems and Demand Analysis: An Application to the Pattern of British Demand", The Economic Journal: The Journal of the Royal Economic Society, 1954, pp. 511-527, vol. LXIV, Macmillan & Co., London.
Tackling the Issue of Bust-Out Fraud, Retail Banker International, Jul. 24, 2007.
UPI, "Nielsen Media Research goes electronic," Jun. 14, 2006, 1 page.
Whitney, Daisy, "Atlas Positioning to Shoulder VOD Ads; Campaign Management Tools Optimize Inventory," TelevisionWeek, May 23, 2005, 3 pages.
Working, Holbrook, "Statistical Laws of Family Expenditure", Journal of the American Statistical Association, 1943, pp. 43-56, vol. 38, American Statistical Association, Washington, D.C.

* cited by examiner

FIG. 10

| FIG. 10A | FIG. 10B |
|---|---|

FIG. 10A

| Media Vehicle | [C] INSPIRATIONAL | | | [C] TRUSTWORTHY | | | [C] LIFE ENHANCING | | | [C] SOCIAL INTERACTION | | |
|---|---|---|---|---|---|---|---|---|---|---|---|---|
| | Observations | Score | Index | Observations | Score | Index | Observations | Score | Index | Observations | Score | Index |
| | 26675 | 246 | 100 | 25156 | 252 | 100 | 24423 | 191 | 100 | 26814 | 263 | 100 |
| First | 339 | 394 | 160 | 330 | 354 | 140 | 316 | 287 | 150 | 336 | 318 | 121 |
| Second | 280 | 322 | 131 | 277 | 354 | 140 | 236 | 192 | 101 | 279 | 316 | 120 |
| Third | 242 | 315 | 128 | 215 | 241 | 96 | 207 | 179 | 94 | 232 | 268 | 102 |
| Fourth | 211 | 312 | 127 | 189 | 253 | 100 | 182 | 166 | 87 | 210 | 255 | 97 |
| Fifth | 229 | 301 | 122 | 216 | 292 | 116 | 211 | 238 | 125 | 229 | 317 | 121 |
| Sixth | 320 | 297 | 121 | 328 | 337 | 134 | 304 | 253 | 132 | 325 | 331 | 126 |
| Seventh | 426 | 292 | 119 | 431 | 312 | 124 | 400 | 240 | 126 | 428 | 303 | 115 |
| Eighth | 324 | 290 | 118 | 287 | 243 | 96 | 279 | 192 | 101 | 325 | 287 | 109 |
| Ninth | 205 | 290 | 118 | 183 | 262 | 104 | 175 | 161 | 84 | 199 | 264 | 100 |
| Tenth | 266 | 288 | 117 | 262 | 321 | 127 | 265 | 286 | 150 | 270 | 307 | 117 |
| Eleventh | 220 | 288 | 117 | 222 | 331 | 131 | 211 | 275 | 144 | 222 | 306 | 116 |
| Twelfth | 473 | 287 | 117 | 480 | 322 | 128 | 434 | 230 | 120 | 481 | 313 | 119 |
| Thirteenth | 370 | 284 | 115 | 336 | 251 | 100 | 312 | 163 | 85 | 361 | 245 | 93 |
| Fourteenth | 414 | 284 | 115 | 417 | 322 | 128 | 389 | 226 | 118 | 422 | 309 | 117 |
| Fifteenth | 264 | 282 | 115 | 236 | 249 | 99 | 233 | 175 | 92 | 263 | 275 | 105 |
| Sixteenth | 244 | 281 | 114 | 221 | 256 | 102 | 218 | 193 | 101 | 237 | 246 | 94 |
| Seventeenth | 237 | 280 | 114 | 215 | 263 | 104 | 197 | 193 | 101 | 222 | 244 | 93 |
| Eighteenth | 280 | 280 | 114 | 278 | 342 | 136 | 266 | 250 | 131 | 282 | 328 | 125 |
| Nineteenth | 239 | 276 | 112 | 212 | 263 | 104 | 209 | 183 | 96 | 237 | 242 | 92 |
| Twentieth | 244 | 275 | 112 | 221 | 243 | 96 | 215 | 171 | 90 | 239 | 231 | 88 |
| Twenty-first | 393 | 275 | 112 | 383 | 313 | 124 | 343 | 204 | 107 | 392 | 283 | 108 |

| | [G] TRUSTWORTHY | | | | |
|---|---|---|---|---|---|
| Observations | 100-199 | 200-299 | 300-399 | 400-499 | |
| Media Vehicle | 25156 | 37% | 24% | 21% | 18% |
| First | 277 | 10% | 18% | 27% | 46% |
| Second | 330 | 7% | 18% | 30% | 45% |
| Third | 278 | 9% | 19% | 29% | 43% |
| Fourth | 135 | 15% | 25% | 18% | 42% |
| Fifth | 328 | 9% | 21% | 31% | 39% |
| Sixth | 222 | 11% | 24% | 28% | 37% |
| Seventh | 262 | 14% | 22% | 27% | 36% |
| Eighth | 84 | 21% | 9% | 35% | 36% |
| Ninth | 251 | 20% | 22% | 24% | 35% |
| Tenth | 256 | 18% | 20% | 28% | 34% |
| Eleventh | 417 | 11% | 25% | 30% | 34% |
| Twelfth | 383 | 14% | 24% | 30% | 32% |
| Thirteenth | 431 | 15% | 20% | 33% | 31% |
| Fourteenth | 480 | 12% | 20% | 37% | 31% |
| Fifteenth | 223 | 15% | 16% | 39% | 31% |
| Sixteenth | 211 | 22% | 19% | 29% | 30% |
| Seventeenth | 115 | 32% | 18% | 19% | 30% |
| Eighteenth | 227 | 18% | 20% | 33% | 29% |
| Nineteenth | 267 | 11% | 23% | 38% | 28% |
| Twentieth | 227 | 27% | 20% | 26% | 27% |
| Twenty-first | 215 | 35% | 25% | 14% | 26% |

FIGURE 11

| TOP 2 BOX | | | |
|---|---|---|---|
| [G] This definitely affects me emotionally | | | |
| Media Vehicle | Pct | Rank | Index |
| First | | 27 | 46 | 100 |
| Second | | 27 | 46 | 100 |
| Third | | 27 | 46 | 100 |
| Fourth | | 27 | 46 | 100 |
| Fifth | | 26 | 50 | 96 |
| Sixth | | 26 | 50 | 96 |
| Seventh | | 26 | 50 | 96 |
| Eighth | | 26 | 50 | 96 |
| Ninth | | 26 | 50 | 96 |
| Tenth | | 26 | 50 | 96 |
| Eleventh | | 26 | 50 | 96 |
| Twelfth | | 26 | 50 | 96 |
| Thirteenth | | 25 | 58 | 93 |
| Fourteenth | | 25 | 58 | 93 |
| Fifteenth | | 25 | 58 | 93 |
| Sixteenth | | 25 | 58 | 93 |
| Seventeenth | | 25 | 58 | 93 |
| Eighteenth | | 24 | 63 | 89 |
| Nineteenth | | 24 | 63 | 89 |
| Twentieth | | 23 | 65 | 85 |
| Twenty-first | | 23 | 65 | 85 |
| ••• | | 23 | 65 | 85 |
|  | | 23 | 65 | 85 |
|  | | 22 | 69 | 81 |
| Media Avg | | 27 | | |

| TOP 2 BOX | | | |
|---|---|---|---|
| [G] It helps me to see that these are good | | | |
| Media Vehicle | Pct | Rank | Index |
| First | | 29 | 44 | 104 |
| Second | | 28 | 47 | 100 |
| Third | | 28 | 47 | 100 |
| Fourth | | 28 | 47 | 100 |
| Fifth | | 28 | 47 | 100 |
| Sixth | | 27 | 51 | 96 |
| Seventh | | 27 | 51 | 96 |
| Eighth | | 27 | 51 | 96 |
| Ninth | | 27 | 51 | 96 |
| Tenth | | 27 | 51 | 96 |
| Eleventh | | 27 | 51 | 96 |
| Twelfth | | 27 | 51 | 96 |
| Thirteenth | | 26 | 58 | 93 |
| Fourteenth | | 26 | 58 | 93 |
| Fifteenth | | 26 | 58 | 93 |
| Sixteenth | | 26 | 58 | 93 |
| Seventeenth | | 25 | 62 | 89 |
| Eighteenth | | 25 | 62 | 89 |
| Nineteenth | | 25 | 62 | 89 |
| Twentieth | | 25 | 62 | 89 |
| Twenty-first | | 24 | 67 | 86 |
| ••• | | 24 | 67 | 86 |
|  | | 23 | 69 | 82 |
| Media Avg | | 28 | | |

| TOP 2 BOX | | | |
|---|---|---|---|
| [G] Watching this inspires me to buy | | | |
| Media Vehicle | Pct | Rank | Index |
| First | | 8 | 46 | 100 |
| Second | | 8 | 46 | 100 |
| Third | | 8 | 46 | 100 |
| Fourth | | 8 | 46 | 100 |
| Fifth | | 8 | 46 | 100 |
| Sixth | | 8 | 46 | 100 |
| Seventh | | 7 | 52 | 88 |
| Eighth | | 7 | 52 | 88 |
| Ninth | | 7 | 52 | 88 |
| Tenth | | 7 | 52 | 88 |
| Eleventh | | 7 | 52 | 88 |
| Twelfth | | 7 | 52 | 88 |
| Thirteenth | | 7 | 52 | 88 |
| Fourteenth | | 7 | 52 | 88 |
| Fifteenth | | 7 | 52 | 88 |
| Sixteenth | | 7 | 52 | 88 |
| Seventeenth | | 7 | 52 | 88 |
| Eighteenth | | 7 | 52 | 88 |
| Nineteenth | | 7 | 52 | 88 |
| Twentieth | | 7 | 52 | 88 |
| Twenty-first | | 7 | 52 | 88 |
| ••• | | 6 | 69 | 75 |
| Media Avg | | 8 | | |

FIGURE 13

MULTIMEDIA ENGAGEMENT STUDY

BACKGROUND OF THE INVENTION

1. Field of the Invention

This invention relates to systems and methods for determining multiple dimensions of media consumers' engagement with media vehicles.

2. Description of the Related Art

Advertising agencies, marketing firms, and media broadcasters are endlessly seeking methods to better place advertisements across one or more media channels in order to increase ad sales, ad receptivity, and/or media consumer attention to the advertisements. In this regard, these entities may be interested in receiving data indicating the thoughts and feelings of media consumers in response to viewing, hearing, and/or interacting with specific media vehicles and/or groups of media vehicles.

SUMMARY OF THE INVENTION

In one embodiment, a method comprises receiving an indication of one or more media vehicles, receiving an indication of multiple media engagement dimensions, accessing survey data from a plurality of media consumers, the survey data comprising consumer responses to a plurality of statements, each of the statements being associated with one or more of the media engagement dimensions, and calculating a dimension score for each combination of an indicated media vehicle with an indicated media engagement dimension, wherein the dimension scores are based on at least the consumer responses to questions associated with the respective indicated media engagement dimension, the dimension scores being indicative of a relationship between respective indicated media vehicles and respective indicated media engagement dimensions.

In one embodiment, a method of determining an engagement score for a television program comprises accessing data regarding responses from each of a plurality of viewers of a television program to each of a plurality of statements, determining respective subsets of the plurality of statements that are associated with each of an inspirational and a trustworthy engagement dimensions, calculating an inspirational dimension score based on at least the responses associated with the subset of the statements associated with the inspirational engagement dimension, and calculating a trustworthy dimension score based on at least the responses associated with the subset of the statements associated with the trustworthy engagement dimension. In one embodiment, the method further comprises calculating a life enhancing dimension score based on at least the responses associated with a subset of the statements associated with a life enhancing engagement dimension.

In one embodiment, a system of determining a plurality of dimension scores for a media vehicle comprises a data module configured to access survey data comprising a plurality of responses of media consumers to respective of a plurality of statements associated with a media vehicle, and a scoring module configured to calculate a plurality of dimension scores for the media vehicle, each of the dimension scores indicating respective characteristics of media consumer engagement with the media vehicle, wherein for each of the plurality of dimension scores, the scoring module selects a respective subset of the plurality of responses and, based on the selected subset of response, calculates one of the plurality of dimension scores.

In one embodiment, a system for determining media consumer engagement across multiple multimedia engagement dimensions comprises means for receiving an indication of one or more media vehicles, means for receiving an indication of multiple media engagement dimensions, means for accessing survey data from a plurality of media consumers, the survey data comprising consumer responses to a plurality of statements, each of the statements being associated with one or more of the media engagement dimensions, and calculating a dimension score for each combination of an indicated media vehicle with an indicated media engagement dimension, wherein the dimension scores are based on at least the consumer responses to questions associated with the respective indicated media engagement dimension, the dimension scores being indicative of a relationship between respective indicated media vehicles and respective indicated media engagement dimensions.

In one embodiment, a method of determining media consumer engagement with each of one or more media vehicles comprises selecting one or more media vehicles, selecting multiple engagement dimensions, accessing dimension scores associated with each of the selected engagement dimensions for each of the selected media vehicles, wherein the dimension scores are based on at least media consumer responses to statements associated with respective engagement dimensions, and generating a report comprising indications of relationships between dimensions scores for the selected media vehicles in respective engagement dimensions.

BRIEF DESCRIPTION OF THE DRAWINGS

FIG. 11 is a screenshot illustrating one embodiment of a score range report.

FIG. 13 is a screenshot illustrating one embodiment of a ranking report.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
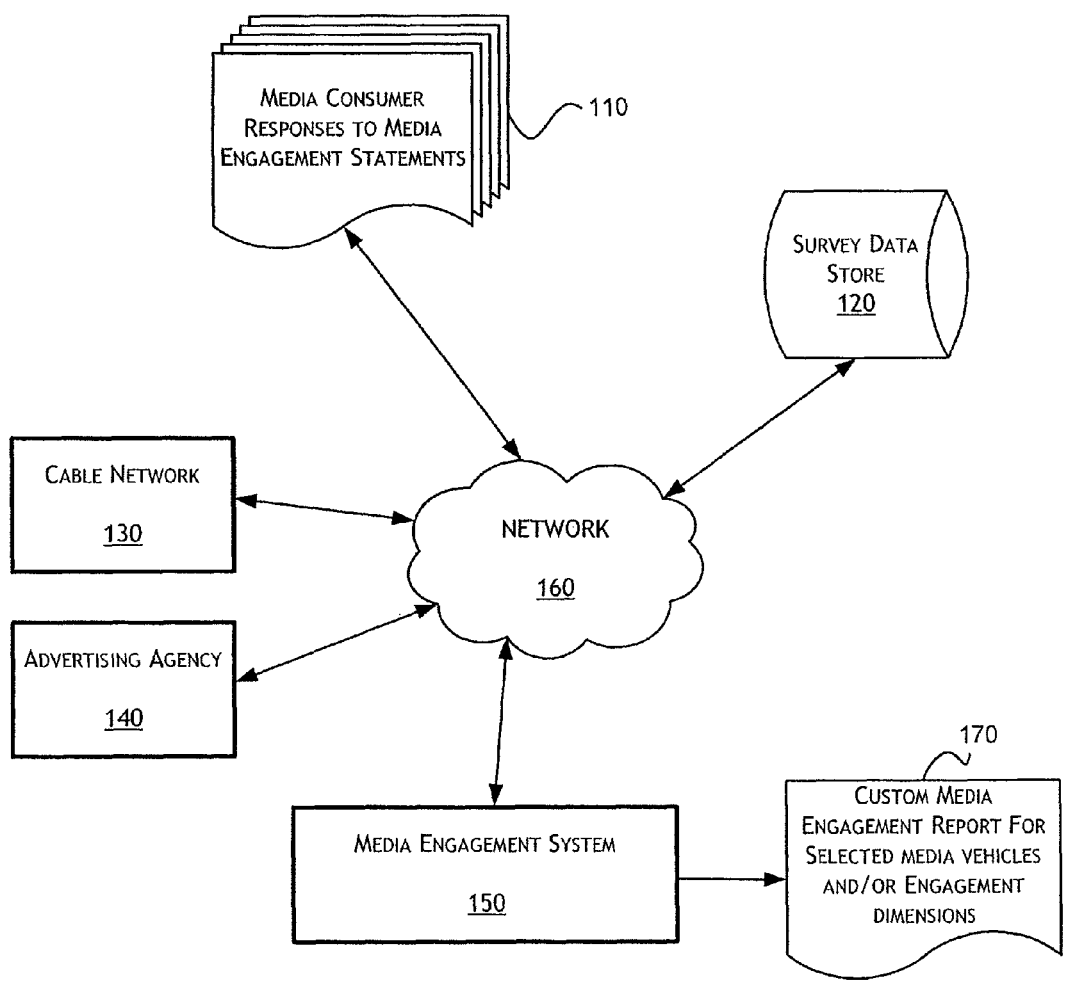
FIG. 1 is a block diagram illustrating one embodiment of a media engagement analysis system in communication with a network.

FIG. 1 is a block diagram illustrating one embodiment of a media engagement system 150 in communication with a network 160. In the embodiment of FIG. 1, customers that receive services and data from the operator of the media engagement system, referred to herein as simply "customers," such as a cable network 130 and an advertising agency 140, are also in communication with the network 160. In one embodiment, for example, the cable network 130 and/or about advertising agency 140 communicate with the media engagement system 150 in order to access data that is useful in monitoring how well various media vehicles engage media consumers. A media consumer, as used herein, comprises an individual, or group of individuals, that watches, reads, listens, and/or interacts, with at least one media vehicle, wherein the media vehicles comprise movies, radio programs, television programs, printed materials, such as books, magazines, and newspapers, and Internet sites, for example. In one embodiment, media vehicles comprise providers of the above-noted media vehicles, such as a television network, radio station, and/or a magazine distributor. Thus, according to the systems and methods discussed herein, multi-dimensional engagement scores may be generated for a television network, for example, in addition to multi-dimensional engagement scores for particular programs distributed by the television network. In other embodiments, media vehicles comprise any other form of advertising, education, and/or entertainment that is accessible to individuals.

As used herein, the term "media engagement statements" or simply "engagement statements" comprises statements and/or questions regarding specific media vehicles and/or or groups of media vehicles. Advantageously, media engagement statements are selected so that responses to the engagement statements by media consumers indicate one or more specific aspects of engagement that the media consumer experiences with reference to the media vehicle indicated in respective engagement statements. Accordingly, media responses to engagement statements from a plurality of media consumers may be analyzed in order to determine various engagement dimensions of media consumers with particular media vehicles. For example, in one embodiment the media engagement dimensions comprise one or more of an inspirational, trustworthy, life enhancing, social interaction, personal timeout, ad attention/receptivity, personal connection, near and dear, interactivity/community, enjoyment/attraction, and image impact dimensions.

Depending on the embodiment, the engagement dimensions may be titled differently, such as with synonymous terms. For example, the term "inspirational" may be replaced or supplemented with one or more of the following terms in describing the same or a similar engagement dimension: enlightening, ennobling, regenerative, stimulating, uplifting. Similarly, the term "trustworthy" may be replaced or supplemented with one or more of the following terms, for example, in describing the same or similar engagement dimension: authentic, believable, credible, ethical, honest. The term "life enhancing" may be replaced or supplemented with one or more of the following terms, for example, in describing the same or similar engagement dimension: enriching, educational. The term "social interaction" may be replaced or supplemented with one or more of the following terms, for example, in describing the same or similar engagement dimension: socializing, conversational. The term "personal timeout" may be replaced or supplemented with the term "me-time," for example, in describing the same or similar engagement dimension.

In one embodiment, dimension scores generated for the above-noted engagement dimensions generally indicate a level of accuracy of the following respective dimension statements, for example:

Inspirational: I am inspired by this program, magazine or Internet site; I have an emotional connection to this program, magazine or site.

Trustworthy: I trust that this program, magazine or website tells the truth and does not sensationalize things.

Life Enhancing: I am always learning about new things and places from this program, magazine or website-things that help me make better decisions in my life.

Social Interaction: This program, magazine or website constantly provides fodder for conversations that I have with friends and family.

Personal Timeout: This program, magazine or Internet site is special to me—the time I spend with this media element is enjoyable and considered "time just for me."

Ad Attention/Receptivity: I am open to viewing/reading advertising on this program, magazine or Internet site because it is interesting and relevant to me.

Personal Connection: I have a personal association with the characters/situations in this vehicle and I would sign up to receive a newsletter or products offered relating to this vehicle.

Near and Dear: This program is part of my regular schedule and I devote my full attention to it.

Interactivity/Community: I enjoy and benefit from the feedback from other users of this site.

Enjoyment/Attraction: This site piques my curiosity. I really enjoy visiting this site.

Image Impact: The photos in this magazine are simply amazing. I often look at the pictures before reading the article or instead of reading the article.

In the embodiment of FIG. 1, responses 110 received from a plurality of media consumers to media engagement statements that are specific to media vehicles are communicated via the network 160 to one or more data stores, such as the survey data store 120 and/or the media engagement analysis system 150. In one embodiment, a plurality of media consumers are each presented with a list of engagement statements for various groups of media vehicles. For example, a first media consumer may be presented with a list of engagement statements (also referred to as a list of engagement questions, a survey, and/or a battery) regarding each of a first plurality of media vehicles and a second media consumer may be presented with engagement statements regarding each of a second plurality of media vehicles. In one embodiment, the specific media vehicles that are included in a particular engagement survey are selected based on the media vehicles with which the media consumer has had a predetermined interaction. Thus, each engagement survey may comprise engagement statements regarding customized groups of media vehicles. A compilation of the responses from a group of media consumers is referred to generally as survey data. For example, survey data may comprise data indicating survey responses received from media consumers over a specific time period and/or from media consumers in a specific geographic region, for example. Alternatively, survey data may include all available data indicating media consumer responses to engagement statements.

In one embodiment the media consumer's provide responses to engagement statements via computerized devices, such as mobile computing devices or desktop computers, for example, while in other embodiments the responses 110 are in written form and are converted to digital data via computerized recognition of responses and/or human review of the engagement surveys. Thus, the responses 110 may be communicated via electronic means from a survey location, from a survey provider location, or the responses 110 may be digitized by an operator, or affiliate, of the media engagement system 150. Various other methods of conducting surveys are known in the art and are contemplated for use in conjunction with the systems and methods described herein.

In an advantageous embodiment, the media engagement system 150 accesses at least some of the responses 110 in order to determine multiple dimensions of engagement exhibited by the media consumers responding to the media engagement statements. As noted above, the media engagement dimensions for respective media vehicles may comprise one or more of an inspirational, trustworthy, life enhancing, social interaction, personal timeout, and ad attention/receptivity dimension. Thus, the media engagement system 150 may determine specific dimension scores indicative of media consumers' engagement with a particular, or group of, media vehicles. As illustrated in the embodiment of FIG. 1, the media engagement system 150 may generate data for a custom media engagement report 170 associated with selected media vehicles and/or engagement dimensions. Examples of such media engagement reports are illustrated in FIGS. 10-13.

I. Media Engagement System

Figure 2:
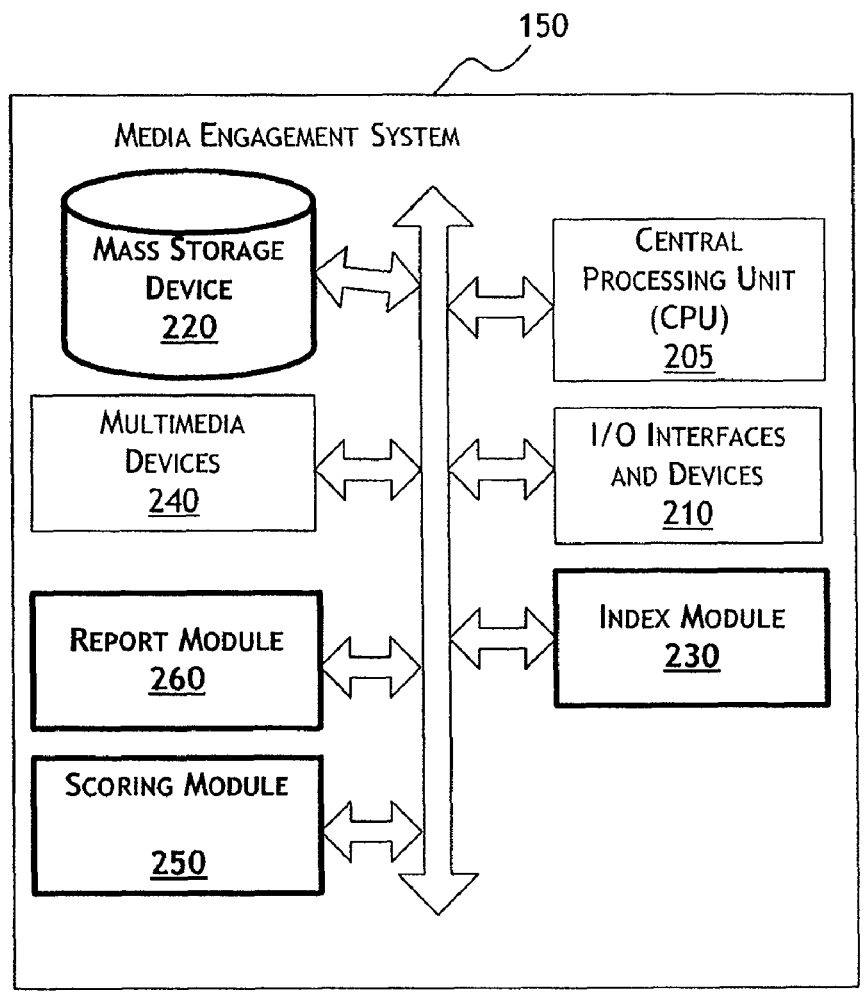
FIG. 2 is a block diagram illustrating one embodiment of the media engagement system of FIG. 1.

FIG. 2 is a block diagram illustrating one embodiment of the media engagement system 150, also referred to herein as simply the "engagement system 150" or the "system 150." In one embodiment, the media engagement system 150 is configured to interface with multiple devices and/or data sources, such as in the exemplary network configuration of FIG. 1. The media engagement system 150 may be used to implement certain systems and methods described herein. For example, in one embodiment the media engagement system 150 may be configured to analyze survey data, such as data stored in the survey data store 220, in order to determine media consumer engagement scores in each of a plurality of engagement dimensions, which may be reported to customers of the media engagement provider in various data and/or report formats. The functionality provided for in the components and modules of the media engagement system 150 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the media engagement system 150 includes, for example, a server or a personal computer that is IBM, Macintosh, or Linux/Unix compatible. In another embodiment, the media engagement system 150 comprises a laptop computer, smart phone, personal digital assistant, or other computing device, for example. In one embodiment, the exemplary media engagement system 150 includes a central processing unit ("CPU") 105, which may include a conventional microprocessor. The media engagement system 150 further includes a memory, such as random access memory ("RAM") for temporary storage of information and a read only memory ("ROM") for permanent storage of information, and a mass storage device 220, such as a hard drive, diskette, or optical media storage device. In certain embodiments, the mass storage device 220 stores portions of the survey data, such as survey data that is stored in the survey data store 120 of FIG. 1. Typically, the modules of the media engagement system 150 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example.

The media engagement system 150 is generally controlled and coordinated by operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the media engagement system 150 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary media engagement system 150 includes one or more commonly available input/output (I/O) interfaces and devices 210, such as a keyboard, mouse, touchpad, and printer. In one embodiment, the I/O devices and interfaces 210 include one or more display device, such as a monitor, that allows the visual presentation of data to a user. More particularly, a display device provides for the presentation of GUIs, application software data, and multimedia presentations, for example. The media engagement system 150 may also include one or more multimedia devices 140, such as speakers, video cards, graphics accelerators, and microphones, for example. In one embodiment, the I/O interfaces and devices 210 comprise devices that are in communication with modules of the media engagement system 150 via a network, such as the network 160 and/or any secured local area network, for example.

In the embodiment of FIG. 2, the I/O devices and interfaces 210 provide a communication interface to various external devices. For example, in this embodiment the media engagement system 150 is in communication with a network 160, such as any combination of one or more LANs, WANs, or the Internet, for example, via a wired, wireless, or combination of wired and wireless, connections via a network interface of the I/O devices and interfaces 210.

In the embodiment of FIG. 2, the media engagement system 150 also includes three application modules that may be executed by the CPU 105. More particularly, the application modules include a scoring module 250, a report module 260, and an index module 230, which are discussed in further detail below. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

A. Scoring Module

The scoring module 250 is configured to determine dimension scores for a plurality of media vehicles. As noted above, media vehicles comprise any type of media that may be consumed by a media consumer, such as a television program, an Internet website, a magazine, a computerized game, a book, a newspaper, etc. Thus, the scoring module 250 is configured to analyze survey data associated with any type of media vehicle. For ease of discussion, an exemplary media vehicle may be described in certain examples provided herein. More particularly, television program media vehicles may be discussed herein. Those of skill in the art will recognize, however, that the systems and methods described herein may be implemented with any type of media vehicle, from any media channel.

In one embodiment, the scoring module 250 accesses survey data comprising information indicating responses of a plurality of media consumers to engagement statements associated with respective media vehicles. For example, a media consumer may be asked to rank the truthfulness (or untruthfulness) of each of a plurality of statements associated with a particular media vehicle. In one embodiment, the media consumer is first asked if they are familiar with the media vehicle and/or if they have watched a predetermined number of episodes of the media vehicle in an optional predetermined time period (or otherwise interacted with a media vehicle from another media channel). Depending on the embodiment, the survey data may be accessed from the survey data store 120 and/or the mass storage device 220 of the media engagement system 150. For example, in certain embodiments, portions of the survey data may be transferred to the mass storage device 220 of the media engagement system 150 so that analysis of the survey data may be expedited.

The scoring module 250 is configured to analyze the survey data and determine one or more dimension scores for a selected group, or all, of the media vehicles included in the survey data. For example, the survey data may include survey information for 600 media vehicles, such as 600 television programs. In one embodiment, a predetermined number of media consumers must respond to statements regarding a particular media vehicle before survey data associated with that particular media vehicle is considered representative of a significantly larger population. For example, if 20 or fewer media consumers responded to statements regarding a particular television program, the survey data for that television program may not be sufficient to extrapolate data that is useful for marketers, advertisers, and others that are interested in media consumer engagement with the television program. Thus, survey data may also indicate a number of media consumers that responded to survey statements regarding each media vehicle.

In one embodiment, the scoring module 250 generates, for each media vehicle, dimension scores for each of a plurality of engagement dimensions. In this embodiment, the engagement dimensions each represent a specific dimension of the media consumer's engagement with the media vehicle. For example, one engagement dimension may indicate a degree of inspirational value provided by the media vehicle. Another engagement dimension may indicate a trustworthy value of the media vehicle, while other engagement dimensions may indicate a life enhancing value, a social interaction value, and/or a personal timeout value of the media vehicle. In some embodiments, an engagement dimension may indicate the media consumer's attention and/or receptivity to advertisements that are included in the media vehicle. Accordingly, the scoring module 250 may generate multiple dimensions scores for each of a plurality of media vehicles. Table 1, below, illustrates exemplary dimension scores for first and second media vehicles, such as television programs.

TABLE 1

| Engagement dimension | First Media vehicle Dimensions scores (100-500) | Second media vehicle dimensions scores (100-500) |
| --- | --- | --- |
| Inspirational | 160 | 270 |
| Trustworthy | 220 | 380 |
| Life enhancing | 200 | 340 |
| Social interaction | 350 | 370 |
| Personal timeout | 390 | 280 |
| Ad attention/receptivity | 210 | 320 |

In the embodiment of table 1, the dimension scores range from 100-500, where a score of 500 indicates that the particular media vehicle is highly engaging and a score of 100 indicates that the particular media vehicle is not engaging with regard to the particular engagement dimension. As illustrated above in table 1, the first media vehicle is less inspirational to media consumers than the second media vehicle, but the second media vehicle is more trustworthy than the first media vehicle. By providing multiple dimensions of media consumer engagement with particular media vehicles, customers of the media engagement provider, such as television networks, for example, may more appropriately sell/place advertising on respective media vehicles.

In one embodiment, the scoring module also determines a total engagement score, which is a combination of a plurality of the dimension scores for a media vehicle. In one embodiment, the total engagement score is an average of a selected group of engagement scores for a media vehicle. For example, a total engagement score for the first media vehicle of table 1 may be calculated as an average of the six illustrated dimension scores (e.g., the average of 160, 220, 200, 350, 390, and 210=255). In another embodiment, the total engagement score may comprise dimension scores associated with only a subset of the scored engagement dimensions. For example, a total engagement score may exclude the ad attention/receptivity engagement score, so that the total engagement score is more representative of the media consumer's engagement with the actual media vehicle, rather than their receptivity to advertisements associated with the media vehicle. Thus, excluding the ad attention/receptivity dimension score for the first media vehicle of table 1, the total engagement score is 264 (the average of 160, 220, 200, 350, and 390). In other embodiments, a total engagement score may include any combination of the scored dimension scores.

In one embodiment, the scoring module 250 is configured to generate one or more dimensions scores that are specific to media vehicles of particular media channels. For example, one or more dimension scores may be determined for television media vehicles, while a different one or more dimension scores may be determined for magazine media vehicles. In one embodiment, television specific engagement dimensions comprise personal connection and/or near and dear. In one embodiment, internet specific engagement dimensions comprise interactivity/community and/or enjoyment/attraction. In one embodiment, print specific engagement dimensions comprise image impact. Thus, the dimension scores available for media vehicles of various media channel may vary. Table 2, below, illustrates the dimension scores of table 1, as well as media channel specific dimension scores for first, second, third, and fourth media vehicles from various media channels.

TABLE 2

| Engagement dimension | First Media vehicle Dimensions scores (TV Media Channel) | Second media vehicle dimensions scores (TV Media Channel) | Third media vehicle dimensions scores (Internet Media Channel) | Fourth media vehicle dimensions scores (Print Media Channel) |
|---|---|---|---|---|
| Inspirational | 160 | 270 | 150 | 340 |
| Trustworthy | 220 | 380 | 190 | 320 |
| Life enhancing | 200 | 340 | 120 | 370 |
| Social interaction | 350 | 370 | 210 | 250 |
| Personal timeout | 390 | 280 | 230 | 280 |
| Ad attention/ receptivity | 210 | 320 | 180 | 340 |
| Personal connection | 300 | 260 | | |
| Near and dear | 400 | 160 | | |
| Interactivity/ community | | | 280 | |
| Enjoyment/ attraction | | | 410 | |
| Image impact | | | | 360 |

As illustrated in table 2, dimension scores for the media channel specific engagement dimensions are calculated only for media vehicles from the respective media channel. In other embodiments, the dimensions illustrated above may be associated with more or fewer media channels. Additionally, the specific dimension titles indicated above may be changed to other synonymous titles. Furthermore, additional engagement dimensions not specifically described herein are contemplated for use in connection with the media engagement system 100 and the various engagement reports discussed herein.

In one embodiment, the scoring module 250 determines the dimension scores based on media consumer responses to respective subgroups of survey statements. Thus, in one embodiment the engagement statements that are used in determining the inspirational dimension scores are different than the engagement statements that are used in determining the trustworthy, life enhancing, etc., dimension scores. In one embodiment, the associations between engagement statements and respective engagement dimensions are determined based on statistical analysis of correlations between survey statements and respective engagement dimensions. Accordingly, the engagement statements are selected for use in developing respective dimension scores based on their strong correlation with the particular engagement dimension. Further discussion of the methods performed by the scoring module in determining scores for media vehicles is provided below with reference to FIGS. 7-9, for example.

B. Index Module

The index module 230 is configured to determine a rank and/or index for each respective media vehicle of a group of selected media vehicles. Thus, the index module 230 is configured to generate data that allows comparison of respective media vehicles with other media vehicles in a group of media vehicles. For example, a user, such as a customer, may select all media vehicles of a particular network broadcaster. In this embodiment, the scoring module 250 generates dimension scores for one or more selected engagement dimensions associated with the media vehicles of the network broadcaster. In addition to the dimension scores, the index module 230 may determine a rank and/or index for each of the media vehicles indicative of a relationship between the respective dimension scores of media vehicles with the remaining media vehicles of the selected network broadcaster. Accordingly, the data provided by the index module 230 allows a user to compare engagement characteristics of specific media vehicles with engagement characteristics of a group of media vehicles.

In one embodiment, the index module 230 generates an index for each of a selected group of media vehicles for each of the scored engagement dimensions. Thus, each media vehicle may comprise multiple indexes, one index for each of the scored engagement dimensions. In one embodiment, an index for a particular media vehicle is calculated as the dimension score for the media vehicle divided by the average dimension score for a selected group of media vehicles. In one embodiment, the above-noted index calculations may each be multiplied by 100 in order to more closely resemble percentages. Accordingly, the indexes represent relationships between particular media vehicle dimension scores and the dimension scores of other media vehicles. Table 3, below illustrates indexes for a group of media vehicles in each of two engagement dimensions.

TABLE 3

| | Inspirational Dimension Score | Inspirational Index | Trustworthy Dimension Score | Trustworthy Index |
|---|---|---|---|---|
| First media vehicle | 250 | 111 | 280 | 140 |
| Second Media Vehicle | 340 | 151 | 270 | 135 |
| Third Media Vehicle | 180 | 80 | 230 | 115 |
| . . . | . . . | . . . | . . . | . . . |
| Average of N Media Vehicles | 225 | | 200 | |

As illustrated in table 3, an average inspirational dimension score for a selected group of N media vehicles, such as all media vehicles of one or more broadcasters, for example, is 225, while an average trustworthy dimension score for the selected group of media vehicles is 200. Accordingly, the first media vehicle, having an inspirational dimension score of 250 and a trustworthy dimension score of 280, has higher dimension scores than the respective dimension averages in both dimensions. Thus, the inspirational Index of 111 for the first media vehicle indicates that that particular first media vehicle has an inspirational dimension score that is higher then 11% of the inspirational dimension scores for the N media vehicles. Likewise, the trustworthy Index of 144 the first media vehicle indicates that the trustworthy dimension score of 280 for the first media vehicle is on average, higher than 40% of the N media vehicles. The inspirational Index of 80 for the third media vehicle indicates that the inspirational dimension score for the third media vehicle is on average, lower than 20% of the N media vehicles. Thus, if the N media vehicles comprise all, or a subset of, television programs offered by a network broadcaster, the indexes indicate relationships between specific media vehicles and the selected group of media vehicles offered by the network broadcaster. Likewise, the N media vehicles may be selected to comprise media vehicles from multiple broadcasters and/or other content providers, such that the indexes are indicative of relationships between specific media vehicles and media vehicles from multiple broadcasters and/or other content providers.

C. Report Module

The report module 230 is configured to access the dimension scores and/or indexes for a selected group of media vehicles and generate a report indicative of the accessed data. For example, the report module 260 may generate a report indicating multiple dimension scores for each of a plurality of media vehicles, as well as an index for each of the dimension scores. Exemplary reports that may be generated by the report module 230 are illustrated in FIGS. 10-13.

II. Customer Software Module

Figure 3:
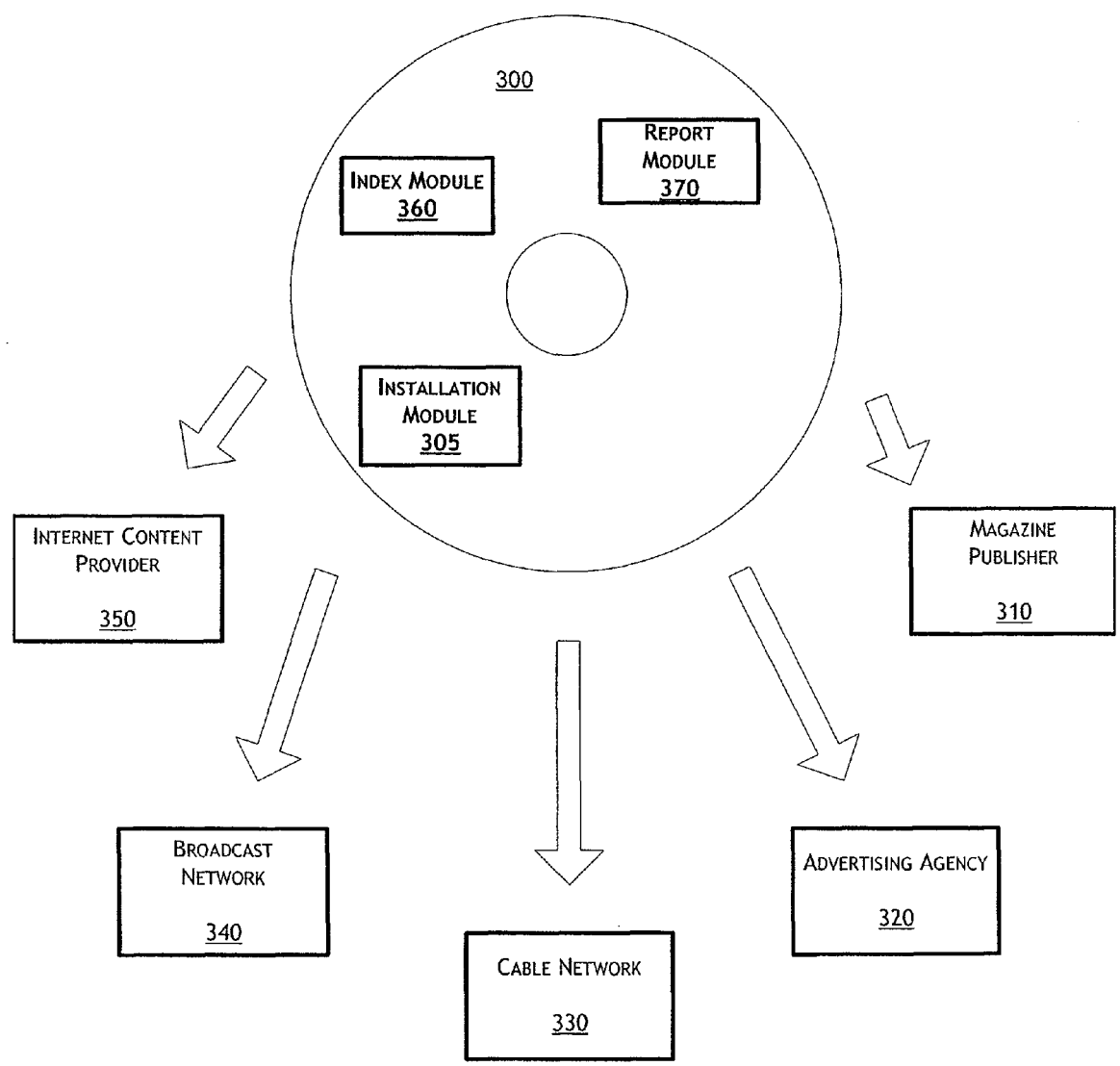
FIG. 3 illustrates one embodiment of a software package comprising certain modules of the media engagement system.

FIG. 3 illustrates one embodiment of a software package 300 comprising certain modules of the media engagement system 150 (FIG. 2). In the exemplary embodiment of FIG. 3, the software package 300 comprises the index module 360, the report module 370, and an installation module 305. In one embodiment, the installation module 305 is configured to install software that interfaces with the index module 360 and the report module 370 in determining indexes for media vehicles and preparing reports illustrating various engagement data, such as dimension scores for a selected group of engagement dimensions. As illustrated in FIG. 3, the software package 300 may be distributed to a plurality of different customer types, including an Internet content provider 350, a broadcast network 340, a cable network 330, an advertising agency 320, and a magazine publisher 310. Thus, the software package 300 may be used by many different entities in order to access the multi-dimensional engagement scores and other related data. In one embodiment, the software package 300 also comprises one or sets of survey data.

Referring to FIG. 1, a cable network 130 and an advertising agency 140 are illustrated in communication with the network 160. In this embodiment, the cable network 130 and/or the advertising agency 140 may have the software package 300 installed on their respective computing devices such that dimension scores associated with the consumer responses 110 may be directly accessed and used in developing indexes for respective media vehicles and custom reports. For example, in one embodiment the dimension scores developed by the media engagement system 150 may be stored in the survey data store 120. Accordingly, with the software package 300 installed on a networked computing device, such as the cable network 130 computing device, the cable network 130 may be authorized to access the dimension scores directly from the survey data store 120, rather than requiring the media engagement system 150 to access to the dimension scores, generate indexes, and/or generate reports for the cable network 130.

In one embodiment, the index module 260 and the report module 270 perform substantially the same functions as the index module 130 and report module 170, respectively, of FIG. 2. In other embodiments, the index module 360 and/or report module 370 have fewer or additional features than the respective index module 130 and report module 170 of FIG. 2.

III. Engagement Survey

Figure 4:
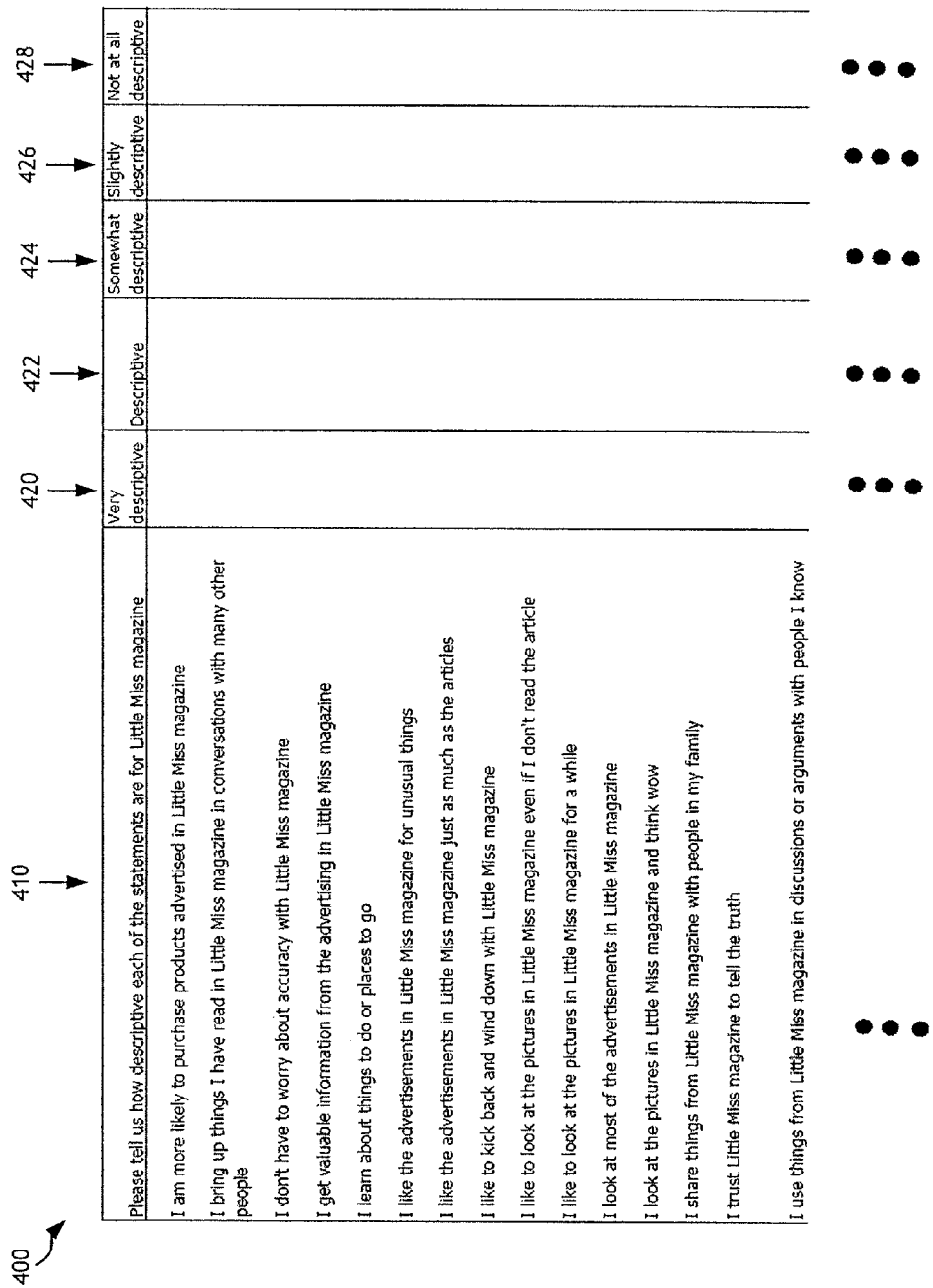
FIG. 4 is a diagram illustrating one embodiment of an engagement survey including statements associated with a specific media vehicle.

FIG. 4 is a diagram illustrating one embodiment of an engagement survey including a sample of statements associated with a specific media vehicle. As illustrated in FIG. 4, the engagement survey 400 includes multiple statements 410 associated with a specific media vehicle, which is the printed magazine "Little Miss" in the embodiment of FIG. 4. Thus, each of the plurality of statements 410 elicits responses from the media consumer regarding their engagement with Little Miss magazine. The exemplary engagement survey 400 provides the media consumer with five response options, wherein one of the response options may be selected for each of the statements 410. In particular, the exemplary engagement survey 400 includes response options for very descriptive 420, descriptive 422, somewhat descriptive 424, slightly descriptive 426, and not at all descriptive 428. Accordingly, the media consumer may indicate how well each of the plurality of statements 410 describes the specific media vehicle, Little Miss magazine. Depending on the embodiment, the engagement survey 400 may include different engagement statements and more or less engagement statements 410 than are illustrated in FIG. 4.

Figure 5:
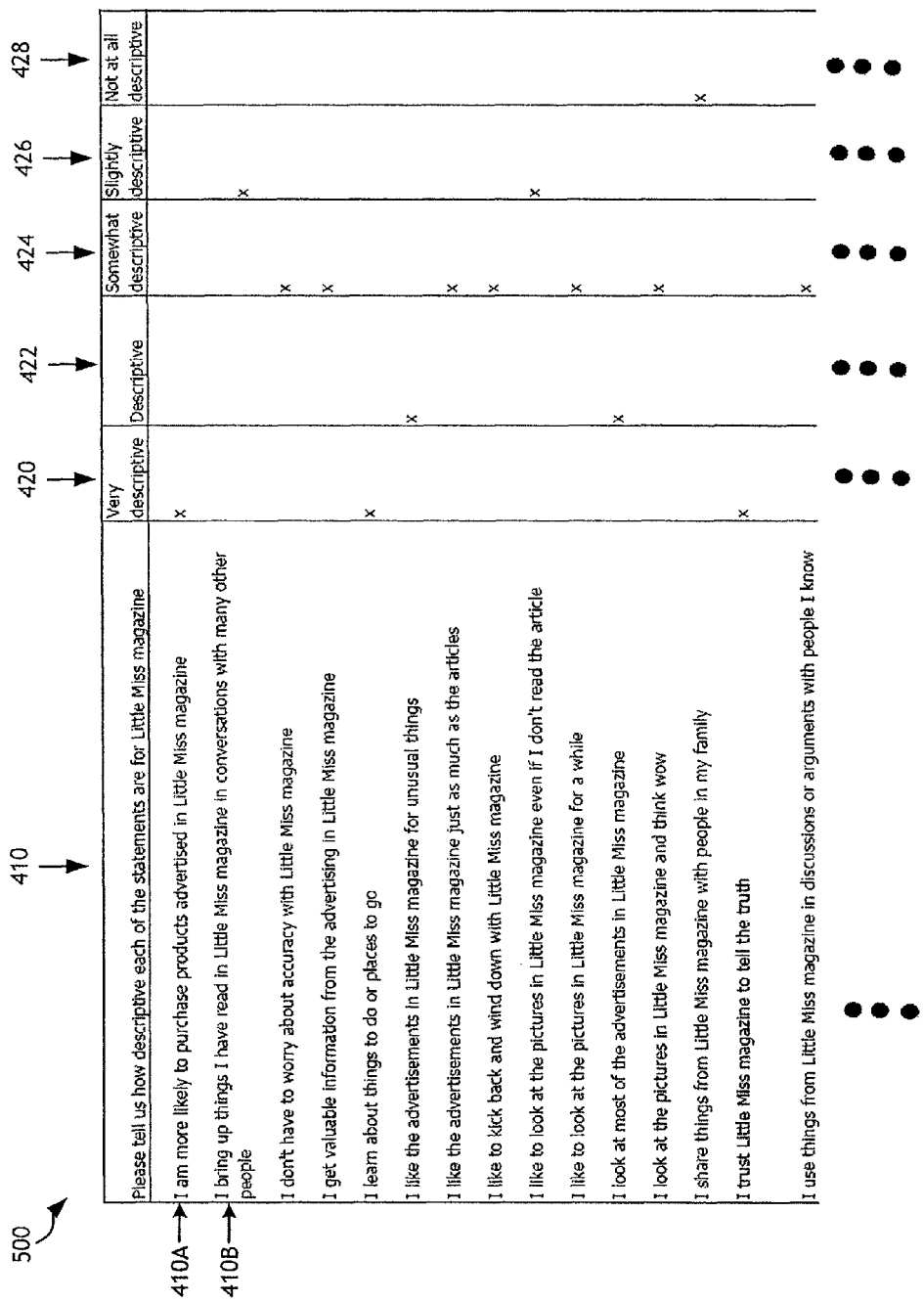
FIG. 5 illustrates the engagement survey of FIG. 4 with responses to the exemplary engagement statements from a single media consumer.

FIG. 5 illustrates the engagement survey 400 with responses to the exemplary engagement statements 410 from a single media consumer. As illustrated in FIG. 5, the media consumer indicated that statement 410A is very descriptive, while engagement statement 410B is only slightly descriptive of Little Miss magazine. The responses recorded by the media consumer in columns 420, 422, 424, 426, 428 may be recorded as part of survey data that is stored in the survey data store 120, for example, and accessed by the media engagement system 150 and/or one or more other computing devices. Depending on the embodiment, the engagement survey 500 may be presented to media consumers in paper form, such that the media consumer indicates their responses to the engagement statements by placing physical marks on the printed engagement survey 500. In other embodiments, the engagement survey 500 may be electronic such that the media consumer provides responses to the presented engagement statements via an input device, such as a keyboard and/or mouse, for example. In one embodiment, the engagement statements are presented to the engagement consumer via a web interface that may be accessed by the media consumer via a web enabled computing device. In other embodiments, the electronic representation of the engagement survey 500 may be presented on computing devices at a location designated for allowing media consumers to complete engagement surveys.

Figure 6:
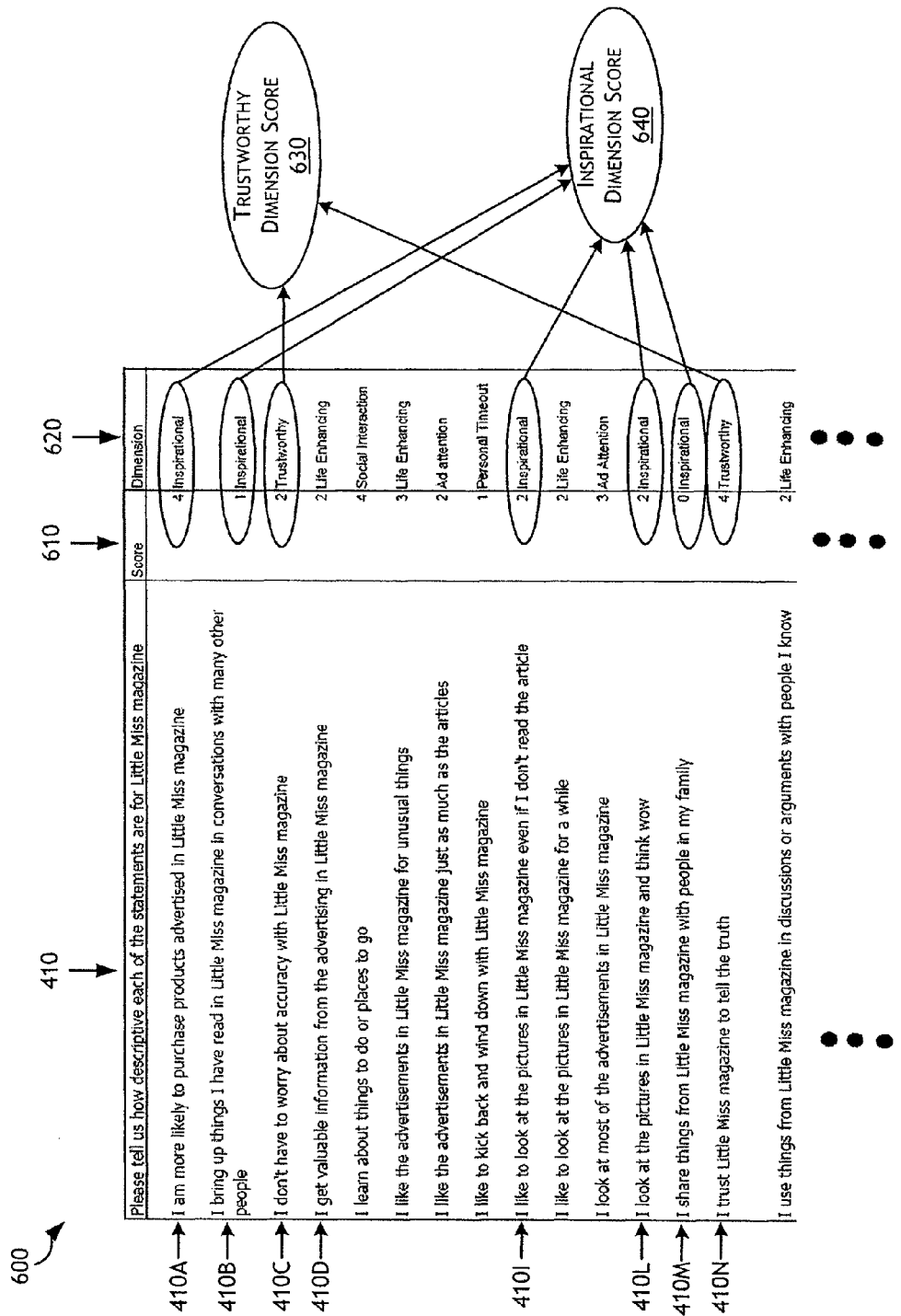
FIG. 6 illustrates the engagement statements of FIGS. 5 and 6, where the responses provided by the media consumer have been translated to numerical response scores ranging from zero to four

FIG. 6 illustrates the engagement statements 410 of FIGS. 4 and 5, where the responses provided by the media consumer have been translated to numerical response scores ranging from zero (e.g., indicating that the media consumer indicated that a particular engagement statement was "not at all descriptive") to four (e.g., indicating that the media consumer indicated that the particular engagement statement was "very descriptive"). Thus, statement 410A, which the media consumer indicated was very descriptive of Little Miss magazine has been assigned a response score of four, as illustrated in column 610. Likewise, the engagement statement 410B, which the media consumer indicated was only "slightly descriptive" of Little Miss magazine has been assigned a response score of one, as illustrated in column 610. In other embodiments, other ranges of response scores may be associated with responses from media consumers. In one embodiment, for example, the media consumer may be asked to provide a numerical representation of a level of descriptiveness of each engagement statement. For example, the media consumer may be asked to provide a numerical figure from zero to four indicating a level of descriptiveness of each engagement statement.

In the embodiment of FIG. 6, a dimension association column 620 indicates an engagement dimension associated with each of the engagement statements 410. As illustrated in FIG. 6, the engagement statements 410A and 410B are each associated with an inspirational dimension. However, engagement statement 410C is associated with a trustworthy engagement dimension and engagement statement 410D is associated with a life enhancing engagement dimension. Thus, the engagement statements are categorized as relevant to particular engagement dimensions.

In the embodiment of FIG. 6, a trustworthy dimension scores 630 and an inspirational dimension scores 640 are illustrated, wherein a plurality of response scores from column 610 are associated with respective of the trustworthy dimension score 630 and the inspirational dimension score 640. For example, the response scores for engagement statements 410A, 410B, 410I, 410L, and 410L are each associated with the inspirational dimension score 640, as well possibly other response scores associated with other engagement statements that are not illustrated in exemplary FIG. 6. Likewise, the response score for engagement statement 410C and 410N are associated with the trustworthy dimension scores 630, as well possibly other response scores associated with other engagement statements that are not illustrated in exemplary FIG. 6. Each of the engagement statements of FIG. 6 that are not associated with the trustworthy or inspirational dimension scores 630,640 may be respectively associated with other dimension scores that are not illustrated.

IV. Exemplary Dimension Score Determination

Figure 7:
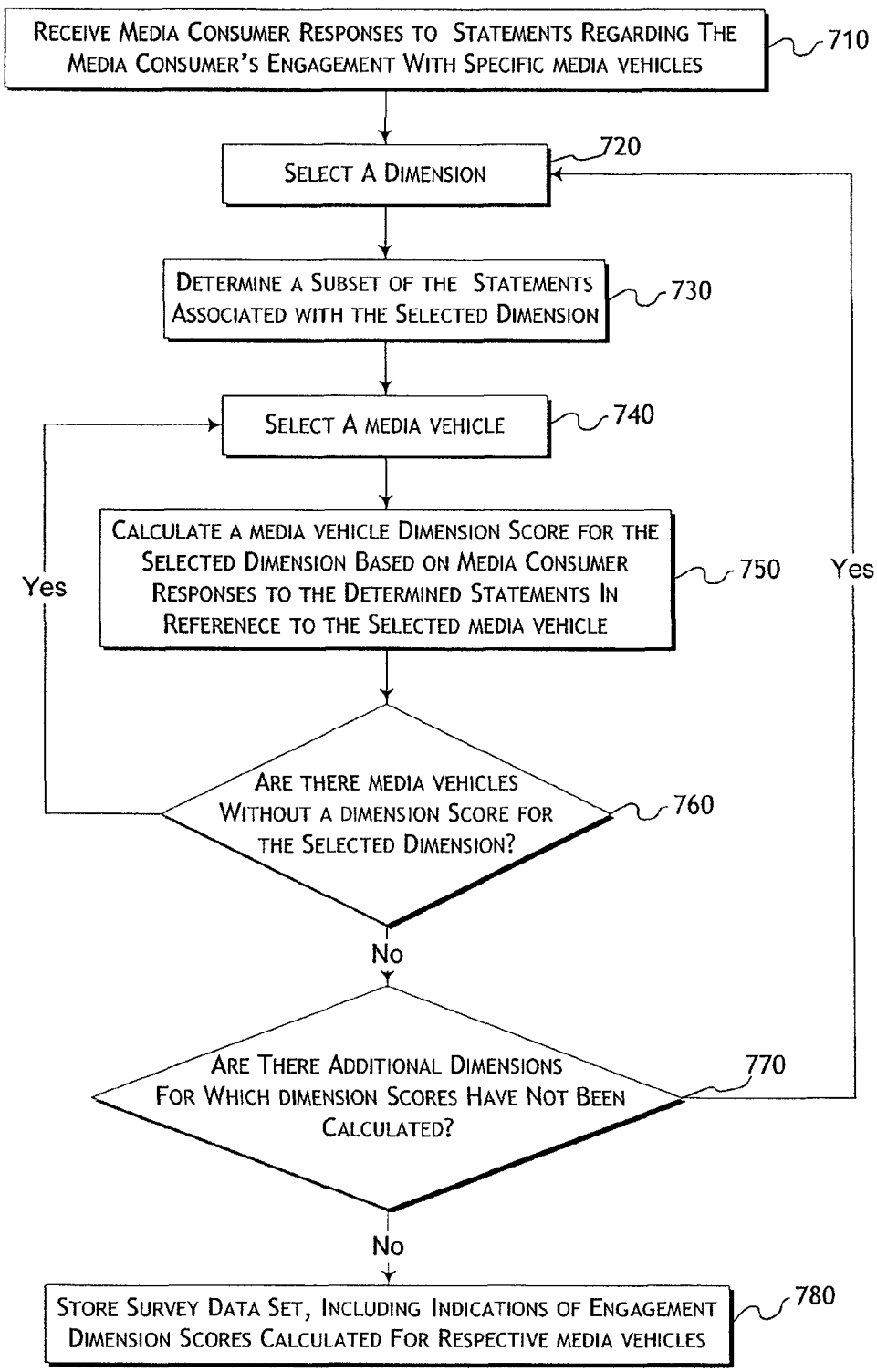
FIG. 7 is a flowchart illustrating one embodiment of a method of determining dimension scores for multiple media vehicles.

FIG. 7 is a flowchart illustrating one embodiment of a method of determining dimension scores for multiple media vehicles. In one embodiment, the method of FIG. 7 is performed by one or more modules of the media engagement system 150, such as the report module 268, the index module 230, and/or the scoring module 250. In other embodiments, other modules and/or computing devices may be used to implement the method of FIG. 7. Depending on the embodiment, the method of FIG. 4 may comprise additional or fewer steps, and the steps may be arranged in a different order than illustrated in FIG. 7.

Beginning in block 710, media consumer responses to statements regarding the media consumer's engagement with specific media vehicles are received. For example, survey data comprising response data from a plurality of media consumers is received by the media engagement system 150. As noted above, survey data may be stored in a data store, such as the survey data store 120 of FIG. 1 and/or the mass storage device 720 of the media engagement system 150 (FIG. 2). Thus, in one embodiment the scoring module 750, for example, accesses survey data stored in one or more local or networked data stores.

Continuing to block 720, an engagement dimension is selected for scoring. For example, if six different engagement dimensions are to be scored, a single engagement dimension of the six is selected in block 720. As described below with reference to block 770, once the selected engagement dimension has been scored for all of the media vehicles included in the survey data, the method returns to block 720 where another engagement dimension is selected for scoring. Depending on the embodiment, the engagement dimensions that are scored may vary. For example, the set of engagement dimensions may vary based on the media channel, or channels, of the media vehicles in the engagement survey.

Moving to block 730, a subset of the engagement statements that are associated with the selected dimension are determined. As noted above, in one embodiment each of the statements of an engagement survey is associated with an engagement dimension. Thus, a particular engagement dimension may be associated with a plurality of statements of the engagement survey. For example, as illustrated in FIG. 6, certain of the engagement statements 410 are associated with the trustworthy dimension, while another subset of the engagement statements 410 are associated with the trustworthy dimension. Similarly, other subsets of engagement statements 410 are associated with other engagement dimensions. In block 730, the subset of statements associated with the dimension selected in block 720 are determined. Thus, with reference to FIG. 6, if the inspirational dimension is selected in block 720, the response scores associated with engagement statements 410A, 410B, 410I, 410L, and 410M, among other possible response scores not illustrated in FIG. 6, are selected for use in determining the inspirational dimension score.

Continuing to block 740, a specific media vehicle is selected for scoring. As noted above, an engagement survey may be completed for each of a plurality of media vehicles so that the response scores are specific to each media vehicle. Thus, the engagement statements 410 (FIGS. 4, 5, and 6) are specific to a single media vehicle, Little Miss magazine. Additional engagement surveys comprising engagement statements associated with other media vehicles may also be provided to the same, or different, media consumers.

Next, in block 750, a media vehicle dimension for the selected dimension is calculated based on response scores from a plurality of media consumers in response to engagement statements associated with the selected media vehicle. Thus, if the inspirational dimension is selected in block 720 and the Little Miss magazine media vehicle is selected in block 740, the response scores associated with at least engagement statements 410A, 410B, 410I, 410L, and 410M are used in calculating the inspirational dimension score for Little Miss magazine. Similarly, if the trustworthy dimension is selected in block 720 and the Little Miss magazine media vehicle in selected in block 740, the response scores associated with at least engagement statements 410C and 410N are used to determine the trustworthy dimension score for Little Miss magazine.

In one embodiment, the dimension score is calculated as a normalized average of the response scores associated with the selected engagement statements. More particularly, an average of the response scores associated with the selected engagement statements may be calculated and the average score may then be normalized to a desired dimension score range. For example, if the average of response scores from a plurality of media consumers is 2.8, on a zero to four scoring scale, the actual dimension score may be calculated by multiplying the average response score by 100, resulting in a dimension score of 280.

Depending on the embodiment, the dimension scores have various ranges. For example, in one embodiment dimension scores range from 0-4, similar to the exemplary response scores of FIG. 6. In other embodiments, the dimension scores range from 100 to 500. In other embodiments, the dimension scores may be academic-type scores, such as from A-F, or numerical scores in any other range.

In one embodiment, certain of the engagement statements 410 are more indicative of media consumer's engagement with respect to a corresponding engagement dimension. Accordingly, in this embodiment the engagement statements may be weighted so that certain response scores have more effect on a dimension score than other response scores (see Block 830 of FIG. 8, for example).

In one embodiment, a group of media consumers that provided responses to statements regarding a particular media vehicle may not be entirely representative of the actual group of individuals that consumes the particular media vehicle. For example, survey data may include engagement responses from 500 media consumers regarding a particular media vehicle, while it is expected that approximately 20,000 individuals regularly consume the particular media vehicle (based on data from Nielsen ratings or the like, for example). Thus, if the Nielsen data indicates that the 20,000 individuals that regularly consumes the particular media vehicle comprises about 80% females, but the 500 media consumers responding to engagement statements in the engagement survey comprises only about 50% females, engagement scores calculated on the engagement data may be weighted to accurately represent the total consuming population. Accordingly, in one embodiment the media engagement system 150 associates weightings to certain media consumer responses in order to normalize the survey data towards the total media vehicle consuming population. In the example above, responses provided by the about 250 female respondents may be weighted more heavily in calculating dimension scores for the particular media vehicle than are the responses provided by the about 250 male respondents. In other embodiments, per-media consumers weightings may be applied based on any attribute of media consumers (e.g., geographic location, age, gender, interests, education, income, etc.) that is believed to be misaligned with the general population of media consumers for particular media vehicles.

In one embodiment, statistical data regarding specific media consumer responses to specific engagement statements is compiled as the dimension scores are calculated. For example, data regarding responses to specific of the selected engagement statements may be accumulated. Such data may be accessed by the media engagement system and/or authorized customers to generate reports such as those illustrated in FIGS. 12-13, for example. Additionally, data regarding dimension scores for individual media consumers, rather than only a dimension score for all media consumers, may be accumulated. Such data may be used in generating reports, such as the report of FIG. 11, for example. Depending on the embodiment, the dimension score calculated in block 750 may comprise a combination, such as an average, of recalculated dimension scores for each of the media consumers.

Continuing to block 760, the scoring module 250, for example, determines if there are additional media vehicles that need to be scored for the selected engagement dimension. In one embodiment, the scoring module 250 determines dimension scores for each media vehicle that has received at least a predetermined number of response scores from qualifying media consumers. For example, if less than five media consumers completed engagement surveys for a first media vehicle, dimension scores may not be calculated for that media vehicle. If additional media vehicles remain to be scored for the selected dimension, the method returns to block 740 where one of the remaining media vehicles is selected for scoring, and then to block 750 where the dimension score for the newly selected media vehicle is calculated.

Returning to block 760, if there are no additional media vehicles to be scored for the selected dimension, the method continues to block 770, where the scoring module 250, for example, determines if there are additional dimensions for which dimension scores have not been calculated. As noted above, the media engagement system 150 is advantageously configured to determine indications of media consumer engagement with media vehicles across multiple engagement dimensions. Thus, blocks 730-760 are repeated for each engagement dimension so that multiple dimension scores for each of the media vehicles may be determined.

When dimension scores for all dimensions have been determined, the method continues to block 780 where the scored survey data set is stored, where use of the term "scored" indicates that dimension scores have been added to the raw survey data, or possibly replace the raw survey data, that is initially accessed by the media engagement system 150 in block 410. Depending on the embodiment, the scored survey data may include indications of each original media consumer response that is in the survey data, the scored survey data may include summary data regarding the original media consumer response, or the scored survey data may not include any indication of the specific media consumer responses to engagement statements.

In one embodiment, the scored survey data is stored in the survey data store 120 of FIG. 1. In certain embodiments, the mass storage device 220 of the media engagement system 150 stores at least portions of the scored survey data. In one embodiment, the computing systems of the customers, such as the cable network 130 or advertising agency 140 may also store portions of the scored survey data, including the dimension scores for certain media vehicles.

Figure 8:
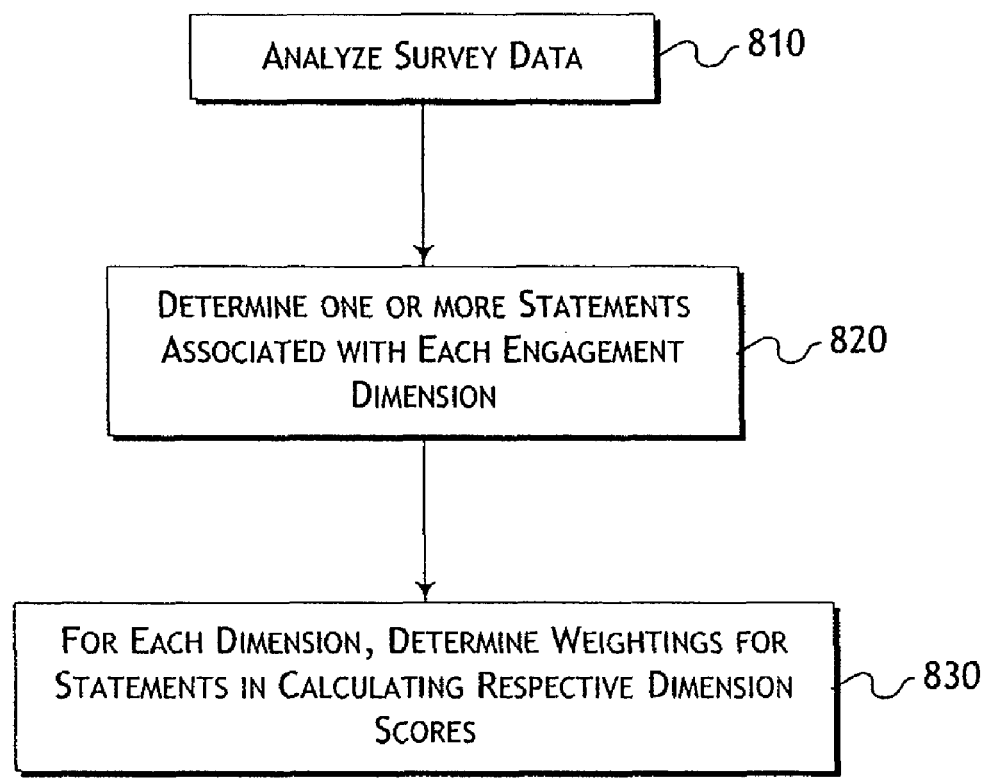
FIG. 8 is a flowchart illustrating one embodiment of a method of calculating a dimension score.

FIG. 8 is a flowchart illustrating one embodiment of a method of calculating a dimension score. In one embodiment, the method of FIG. 8 may be performed for each dimension of each media vehicle. In another embodiment, dimension scores for each media consumer are calculated, such that the scored survey data indicates media consumer-specific dimension scores for media vehicle's receiving adequate responses from the media consumer. In this embodiment, the method of FIG. 8 may be repeated for each combination of media consumer, media vehicle, and engagement dimension to be scored. Depending on the embodiment, the method of FIG. 8 may comprise fewer or additional blocks, and the blocks may be arranged in different order.

Beginning in block 810, survey data including responses to a plurality of engagement statements from a plurality of media consumers is analyzed. In one embodiment, the survey data comprises numerical response scores, such as the response scores illustrated in FIG. 6. In other embodiments, the media engagement system 150 determines numerical response scores based on indications of responses to the engagement statements included in the survey data.

Next, in block 820, one or more statements associated with each engagement dimension are determined. In one embodiment, the engagement statements associated with each of the engagement dimensions is predetermined, such as by statistical analysis of a correlation between respective engagement statements and respective engagement dimensions. Thus, in block 820, the statements and corresponding response scores associated with each engagement dimension are predetermined. In other embodiments, the engagement statements to be associated with respective engagement dimensions are determined based on customized requirements from a customer, for example. In one embodiment, each engagement statement is associated with only one dimension. In other embodiments, each engagement statement may be associated with multiple dimensions, such that response scores for a particular engagement statement may considered in determining multiple dimension scores.

Moving to block 830, for each dimension, weightings for the engagement statements are determined. As noted above, in certain embodiments engagement statements associated with a particular dimension may not be equally weighted. Accordingly, in block 830, the weightings for each of the engagement statements in a selected dimension are determined so that the weightings may be applied to the response scores in order to determine dimension scores that reflect the appropriate weightings.

Figure 9:
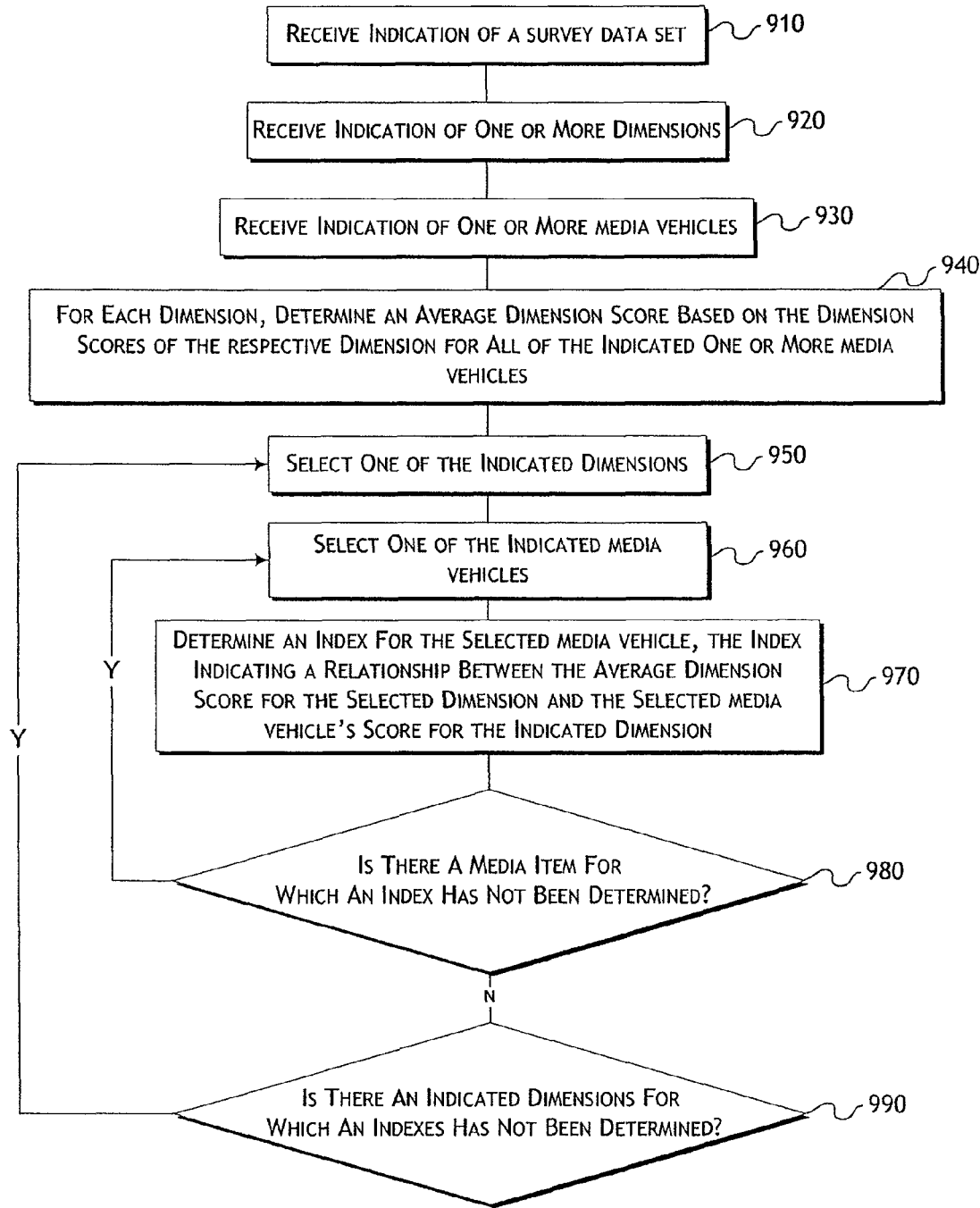
FIG. 9 is a flowchart illustrating one embodiment of a method of determining engagement data for a user-selected group of media vehicles.

FIG. 9 is a flowchart illustrating one embodiment of a method of determining engagement data for a user-selected group of media vehicles. In one embodiment, the method of FIG. 9 is performed by the media engagement system 150, such as in response to requests for engagement data from a customer, such as cable network 130 or advertising agency 140, for example. In another embodiment, the method of FIG. 9 is performed by a computing device having the software package 300 of FIG. 3 installed.

As illustrated in FIG. 9, a computing device accesses scored survey data, such as scored survey data that may be generated according to the method of FIG. 7, in order to generate indexes for each of the media vehicles in a group of media vehicles selected by the user, such as one of the customer illustrated in FIG. 3 (e.g., an Internet content provider 350, a broadcast network 340, a cable network 330, an advertising agency 320, and/or a magazine publisher 310). As noted above, the indexes provide an indication of a relationship between a particular dimension score and the remaining dimension scores of a selected group of media vehicles. While the method of FIG. 9 may be performed by various computing devices, for ease of description the method is described below as being performed by the media engagement system 150. Depending on the embodiment, the method of FIG. 9 may comprise additional or fewer blocks, and the blocks may be arranged in different order.

Beginning in block 910, an indication of one or more scored survey data set to be used in developing dimension scores is received by the media engagement system 150, such as from one of the customers, for example. In one embodiment, the media engagement system 150 has access to multiple sets of scored survey data, where each of the sets of scored survey data represents data received from media consumers at different times and/or in different locations. For example, certain engagement surveys may be presented to a predetermined quantity of media consumers at varying locations every period, where the period may be any time frame, such as 1 month, three months, six months, a year, two years, or more. Additionally, survey data sets may be provided by different entities, either in a raw format that may be scored by the media engagement system 150 or in a pre-scored format. Thus, in block 910, one or more scored survey data sets to be considered in developing engagement data may be selected by the requesting customer, or a default survey data set may be selected by the media engagement system 150, such as a most recent scored survey data set.

Moving to block 920, an indication of one or more dimensions of interest to the requesting customer is received by the media engagement system 150. As noted above, multiple dimensions for each media channel may be available. However, certain customers may not be interested in certain engagement dimensions. Additionally, if the operator of the media engagement system 150 charges a fee for each dimension that is included in a multi-dimensional engagement report, a requesting customer may limit the number of dimensions based on cost constraints. In an advantageous embodiment, the media engagement system 150 selects a set of engagement dimensions that are applicable to a media channel from which media vehicle data is requested (block 930). In this embodiment, block 920 may be skipped and the appropriate dimension may be selected after the customer indicates a group of media vehicles in block 930.

In block 930, an indication of one or more media vehicles is received by the media engagement system 150. In one embodiment in, all media vehicles in a particular media channel may be selected in block 930. In one embodiment, media vehicles may be selected in groups, such as groups associated with publishers/providers of the various media vehicles. For example, all television media vehicles associated with a particular cable channel and/or broadcast channel may be selected in block 930.

Next, in block 940, for each dimension an average dimension score is determined based on the dimension scores for all of the indicated one or more media vehicles. For example, if the dimensions selected in block 920 include inspirational, trustworthy, and life enhancing, at block 940 the average inspirational dimension score is calculated as the average of all inspirational dimension scores for the media vehicles selected in block 930. Likewise, the average trustworthy dimension score is calculated as the average of all trustworthy dimension scores for the media vehicles selected in block 930, and the average life enhancing dimension score is calculated as the average of all life enhancing dimension scores for the media vehicles selected in block 930.

Moving to block 950, one of the indicated dimensions is selected. For example, if the inspirational, trustworthy, and life enhancing engagement dimensions are indicated in block 920, one of the three engagement dimensions is selected in block 950. As discussed below with reference to block 990, the method of blocks 960-980 is repeated for each of the indicated engagement dimensions.

In block 960, one of the indicated media vehicles is selected for indexing. As discussed below with reference to block 980, the method of block 970 is repeated for each indicated media vehicle, which is repeated for each dimension.

In block 970, an index for the selected media vehicle in the selected engagement dimension is determined. In one embodiment, the index indicates a relationship between the average dimension score for the selected dimension and the selected media vehicle's score for the indicated dimension. Accordingly, the index for a particular media vehicle in a dimension indicates how the media vehicle compares to other media vehicles in the indicated group of media vehicles with regard to a particular engagement dimension. In other embodiments, the index for media vehicles is calculated in other manners.

In one embodiment, statistical data regarding specific media consumer responses to specific engagement statements for the selected media vehicles is compiled as the indexes are calculated. For example, data regarding responses to specific of the selected engagement statements may be accumulated. Additionally, data regarding dimension scores for individual media consumers whose response data is used in determining indexes may be accumulated. Such data may be used in generating reports, such as the report of FIG. 11, for example.

Next, in block 980, the media engagement system 150 determines if there are one or more additional media vehicles for which indexes have not been determined with respect to the currently selected engagement dimension. If a media vehicle of the selected one or more media vehicles (block 930) have not yet been associated with an index for the currently selected dimension (block 950), the method returns to block 960 where one of the remaining media vehicles is selected for indexing. If all media vehicles in the indicated group of media vehicles have received indexes for the currently selected dimension, the method continues to block 990.

In block 990, the media engagement system 150 determines if indexes have been determined for media vehicles in each of the indicated dimensions (block 920). If one or more of the indicated engagement dimensions have not been selected for indexing, the method returns to block 950, where one of the remaining dimensions is selected, and then through blocks 960-980 where each of the indicated media vehicles is associated with an index for the selected dimension. Alternatively, if the indicated media vehicles have been indexed in each of the indicated engagement dimensions, the method completes and the indexing data is stored in one or more data stores, such as a mass storage device 220 (FIG. 2) and/or the survey data store 120.

While the method of FIG. 9 has been described with reference to media engagement system 150, in other embodiments the indexing method may be performed by other devices, such as one or more of the customer devices 310, 320, 330, 340, 350 of FIG. 3 executing the index module 360. Accordingly, in one embodiment a customer may generate indexes for a customized group of media vehicles that represents relationships between the specific media vehicles in the customized group, without direct interaction with the media engagement system 150.

Figure 10B:
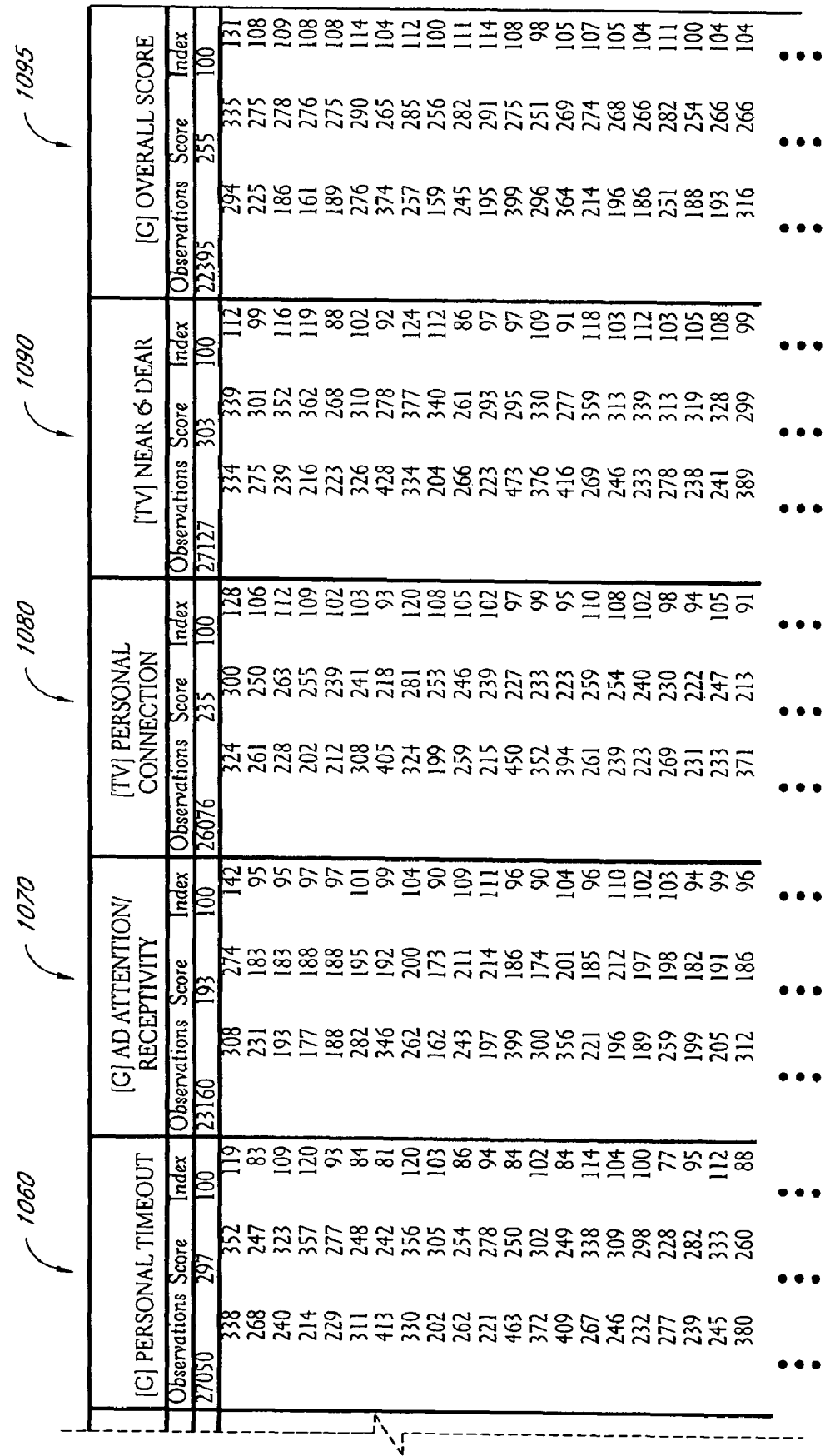
FIG. 10 is a screenshot illustrating one embodiment of a multi-dimensional engagement report comprising engagement data for multiple dimensions for each of a plurality of media vehicles.

FIG. 10 is a screenshot illustrating one embodiment of a multi-dimensional engagement report 1000 comprising engagement data for multiple dimensions for each of a plurality of media vehicles. In particular, the engagement report 1000 includes a media vehicle identifier column 1010, an inspirational dimension section 1020, a trustworthy dimension section 1030, a life enhancing dimension section 1040, a social interaction dimension section 1050, a personal timeout dimension section 1060, an ad attention/receptivity dimension section 1070, a personal connection dimension section 1080, a near-and-dear dimensions section 1090, and an overall score section 1095. Thus, in the embodiment of FIG. 10, the engagement report 1000 indicates dimension scores for each of eight separate engagement dimensions, as well as overall dimension scores for each of the indicated media vehicles.

The exemplary engagement report 1000 includes three columns in each of the dimension segments. Specifically, each section comprises an observations column, a score column, and an index column. In one embodiment, the observations column indicates a number of media consumers that responded to engagement statements regarding a particular media vehicle. In one embodiment, the observations column indicates a total number of media consumers that responded to engagement statements regarding a particular media vehicle, wherein the media consumers met additional criteria for having their responses to the engagement statements included in the survey data set. For example, in one embodiment a media consumer must indicate that they had viewed/heard/interacted with the specific media vehicle a predetermined quantity of times in a predetermined time period.

In one embodiment, the score column of each of the sections 1020, 1030, 1040, 1050, 1060, 1070, 1080, and 1090, indicates dimension scores that are calculated by the media engagement system 150, for example. In one embodiment, the engagement scores are determined using a method similar to that of FIG. 7, for example. Thus, the engagement scores for each media vehicle for respective dimensions may be determined based on media consumer responses to respective groups of engagement statements. As noted above, responses to certain of the engagement statements may be more heavily weighted than others in calculating engagement scores for certain dimensions.

In one embodiment, the indexes illustrated in the index columns of each section 1020, 1030, 1040, 1050, 1060, 1070, 1080, and 1090, indicate respective relationship between media vehicles and the combined group of selected media vehicles. In one embodiment, the indexes are generated using a method similar to that of FIG. 9, above, which may be performed by the media engagement system 150 and/or another computing device executing the index module 360, for example.

In the embodiment of FIG. 10, the engagement report 1000 includes engagement dimension segments 1080, 1090 that may be used only for television media vehicles, such as broadcast and/or network television programs. If the engagement report 1000 included Internet media vehicles, for example, additional dimension segments that are specific to Internet media vehicles may also be included in the report.

In an advantageous embodiment, the customer that generates the engagement report 1000 is provided with an opportunity to select the particular media vehicles to be included in the engagement report, as well as the particular engagement dimensions that should be included in the report. Thus, the customer may customize the engagement report 1000 to include only those media vehicles of interest and/or only those engagement dimensions of interest.

The overall score section 1095 indicates a total score for each media vehicle, where the total score may be based on the engagement scores for each of the dimensions that are selected for inclusion in the report. In other embodiments, the total score is based on a subset of the engagement scores that are selected for inclusion in the report and/or other engagement scores that are not selected for inclusion in the report. For example, the exemplary engagement report 1000 includes total scores in the overall score section 1095 that are based on each of the remaining engagement scores, except for the add attention/receptivity engagement scores in column 1070. Thus, the total scores in section 1095 are indicative of the media consumer's engagement with the actual media vehicle, rather than with advertisements that are included in the media vehicle, such as is indicated by the ad attention/receptivity engagement scores. In other embodiments, however, the ad attention/receptivity engagement scores are included in the total score calculation. In one embodiment, the total scores in the overall score section 1095 are calculated as an average of engagement scores for multiple dimensions. In other embodiments, the total scores are calculated using a weighted average, wherein engagement scores associated with certain engagement dimensions are more heavily weighted than engagement scores of other engagement dimensions.

FIG. 11 is a screenshot illustrating one embodiment of a score range report 1100. The score range report 1100 indicates a percentage of media consumer-specific engagement scores of a selected one or more survey data sets that fall within each of multiple score ranges. Thus, the score range report 1100 provides further details as to media consumer responses to the engagement statements associated with specific dimensions.

The exemplary score range report 1100 indicates percentages of media consumer-specific engagement scores for the trustworthy dimension that fell within each of the ranges 100-199, 200-299, 300-399, and 400-499. As indicated in FIG. 11, for the first media vehicle, 277 media consumers met the criteria for having their responses to engagement statements regarding the first media vehicle included in the scored survey data set, and the media consumers also completed a least a required subset of the statements/questions associated with the trustworthy dimension. For the exemplary first media vehicle, 10% of the 277 media consumers were associated with a trustworthy engagement score in the range of 100-199, 18% of the 277 media consumers were associated with a trustworthy engagement score in the range of 200-299, 27% of the 277 media consumers were associated with a trustworthy engagement score in the range of 300-399, and 46% of the 277 media consumers were associated with a trustworthy engagement score in the range of 400-499.

Figure 12:
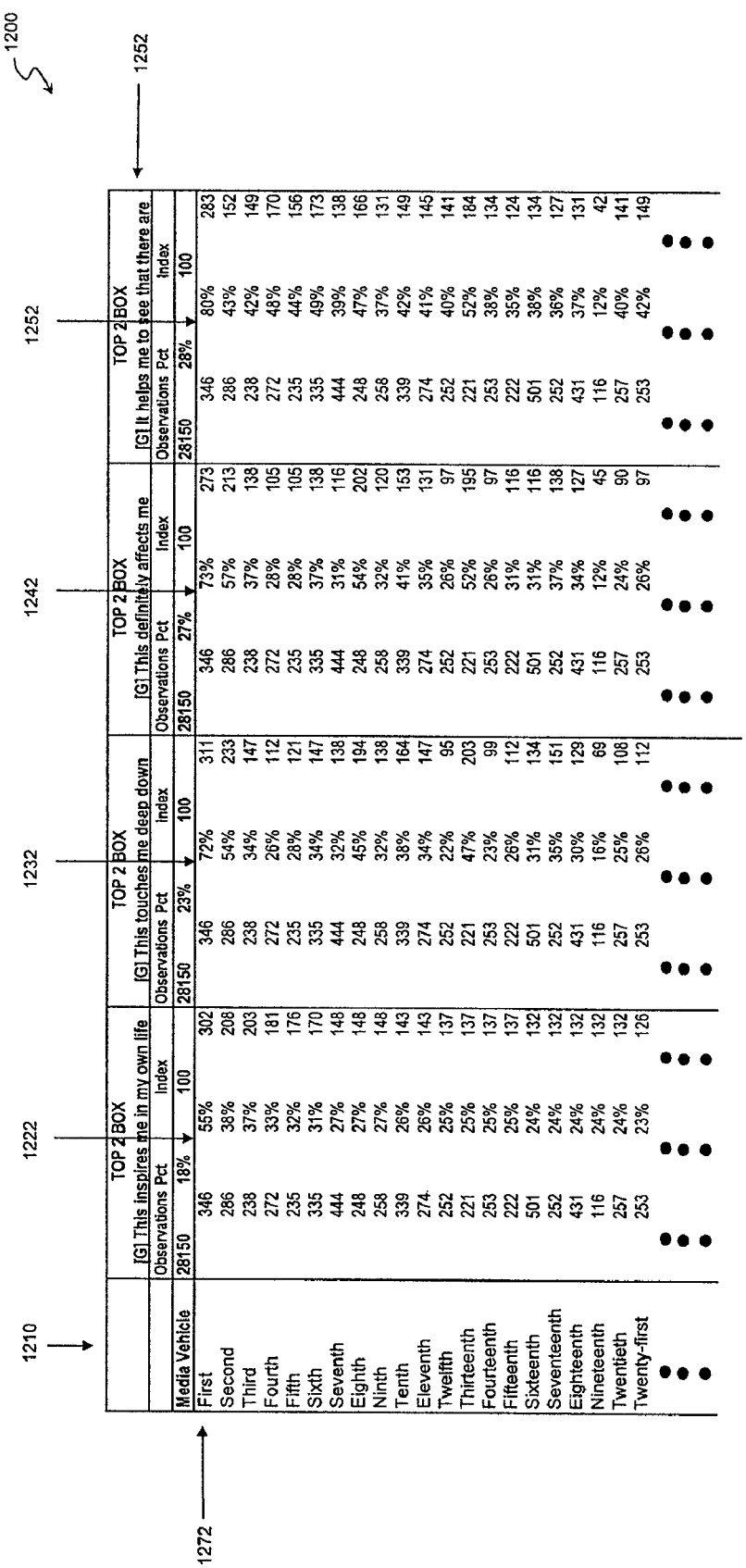
FIG. 12 is a screenshot illustrating one embodiment of a specialized report illustrating associations between specific media vehicles and media consumer responses to specific engagement statements.

FIG. 12 is a screenshot illustrating one embodiment of a specialized report 1200 illustrating associations between specific media vehicles and media consumer responses to specific engagement statements. In certain embodiments, the customer may be interested in understanding how media consumers responded to specific engagement statements with respect to one or more selected media vehicles. Accordingly, in one embodiment the customer may select one or more engagement statements from the plurality of engagement statements that are presented to media consumers, as well as one or more response options for which response data is desired. For example, if the responses available to a media consumer for each engagement statement are "very descriptive," "descriptive," "somewhat descriptive," "slightly descriptive," and "not at all descriptive," the customer, or operator of the media engagement device 150, may select one or more of the response options, thereby requesting data regarding media consumer responses to a selected one or more engagement statements with one or more of the selected response options. For example, if the customer selects only the "very descriptive" response option, a report is generated indicating the percentage of media consumers that selected the "very descriptive" response option in response to each of a selected group of engagement statements for each of one or more specific media vehicles.

The exemplary specialized report 1200 indicates what is referred to as a "top 2 box" percentage for each of a plurality of media vehicles listed in column 1210. In this embodiment, the top 2 box percentages indicate a percentage of media consumers from a selected data set that responded to respective engagement statements by selecting one of a top two response choices, such as the "very descriptive" or "descriptive" response options. In other embodiments, the response choices may be numerical or academic scores, for example, where a top two response choices may be 9 or 10 in a possible response range of 1-10, 4 or 5 in a possible response range of 1-5, or A or B in a possible response range of A-F, for example. In other embodiments, other groups of response options may be selected, such as a top three, top four, bottom two, bottom three, bottom four, or any combination of the response options available to media consumers.

With reference to exemplary report 1200, the percentages illustrated in columns 1222, 1232, 1242, 1252, 1262 indicate percentages of media consumers that responded to the respective engagement statements illustrated in row 1270 with one or both of the top to the response options. For the first media vehicle in row 1272, 55% of the 346 qualifying media consumers responded to the engagement statement "[the first media vehicle] inspires me in my own life," by selecting one of the top two response options. Similarly, 72% of the 346 qualifying media consumers responded to the engagement statement "[the first media vehicle] touches me deep down," by selecting one of the top to response options.

FIG. 13 is a screenshot illustrating one embodiment of a ranking report 1300. In embodiment of FIG. 13, the ranking report 1300 includes sections 1310, 1320, in 1330 that are respectively associated with media consumer responses to respective engagement statements. In particular, section 1310 includes data regarding consumer responses to the engagement statement "this inspires me in my own life," section 1320 includes data regarding consumer responses to this the engagement statement "this touches me deep down," and section 1330 includes data regarding consumer responses to the engagement statement "this definitely affects me emotionally." Thus, each section illustrates relationships between media consumer responses to specific engagement statements and each of a plurality of selected media vehicles.

Similar to FIG. 12, the report 1300 includes data regarding Top 2 Box responses to each of the indicated engagement statements from media consumers. However, rather than indicating percentages of media consumers that selected one or both of the top two response options for each of the selected media vehicles, the report 1300 indicates ranks for each of the media vehicles based on the respective percentages of media consumers selecting one of the top two options for each media vehicle. Accordingly, the first media vehicle in section 1310 has a ranking of "1", indicating that the percentage of media consumers that responded to the engagement statement "[the first media vehicle] inspires me in my own life," with one of the top two response options was higher than the percentage of media consumers that responded to the engagement statement "[the Nth media vehicle] inspires me in my own life" with one of the top two response options. Accordingly, the report 1300 illustrates a relationship between a selected group of media vehicles based on relative rankings.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method comprising:

receiving an indication of one or more media vehicles, respective media vehicles comprising one or more of a specific television program, a specific magazine, a specific Internet site, a specific radio program, and a specific newspaper;

receiving an indication of multiple media engagement dimensions, the media engagement dimensions each representative of one or more specific aspects of engagement that media consumers experience with regard to the respective media vehicles, the media engagement dimensions comprising one or more of an inspirational engagement dimension, a trustworthy engagement dimension, a life enhancing engagement dimension, and a social interaction engagement dimension, wherein the inspirational engagement dimension corresponds to a degree to which media consumers consider respective media vehicles to be one or more of enlightening, ennobling, regenerative, stimulating and uplifting, the trustworthy engagement dimension corresponds to a degree to which media consumers consider respective media vehicles to be one or more of authentic, believable, credible, ethical and honest, the life enhancing engagement dimension corresponds to a degree to which the media consumers consider respective media vehicles to be one or more of enriching and educational, and the social interaction engagement dimension corresponds to a degree to which media consumers consider respective media vehicles to be one or more of socializing and conversational;

accessing survey data from a plurality of media consumers, the survey data comprising responses from respective media consumers to a plurality of statements regarding at least a first media vehicle of the plurality of media vehicles, wherein the media consumer responses indicate respective media consumer views regarding accuracy and/or truthfulness of respective statements;

accessing a data structure indicating relationships between first statements of the plurality of statements and a first media engagement dimension of the multiple media engagement dimensions, wherein the media consumer responses to the first statements are indicative of a level of consumer engagement in the first media engagement dimension; and calculating a dimension score, using one or more computing devices, for the combination of the first media vehicle and the first media engagement dimension, wherein the dimension score is based on at least the consumer responses to the first statements of the plurality of statements with reference to the first media vehicle, wherein the dimension score is indicative of a level of consumer engagement with the first media vehicle in the first media engagement dimension.

2. The method of claim 1, further comprising generating a report indicating at least one dimension score for each of two or more media vehicles in different media channels, the media channels selected from one or more of television, radio, print, or Internet.

3. The method of claim 2 wherein the two or more media vehicles are at least partially owned by a common entity.

4. The method of claim 1, further comprising calculating an index value for the dimension score, wherein the index value indicates a relationship between the dimension score and other dimension scores.

5. The method of claim 4, wherein said calculating an index value comprises dividing the dimension score by an average dimension score.

6. The method of claim 1, further comprising weighting the first statements so that consumer responses to certain of the first statements have more effect on the calculated dimension score than responses to certain others of the first statements.

7. A method of determining an engagement score for a television program, the method comprising:

accessing data regarding responses from a plurality of viewers of a television program to a plurality of statements regarding the television program, the responses indicating views of respective viewers regarding accuracy and/or truthfulness of at least first statements of the plurality of statements which are each associated with one or more of a plurality of media engagement dimensions, the media engagement dimensions each representative of one or more specific aspects of engagement that media consumers experience with regard to the television program, the plurality of media engagement dimensions comprising an inspirational engagement dimension and a trustworthy engagement dimension;

determining a first subset of the first statements that are associated with an inspirational engagement dimension that corresponds to a degree to which media consumers consider the television program to be one or more of enlightening, ennobling, regenerative, stimulating and uplifting;

determining a second subset of the first statements that are associated with a trustworthy engagement dimension that corresponds to a degree to which media consumers consider the television program to be one or more of authentic, believable, credible, ethical and honest;

calculating an inspirational dimension score using one or more computing devices and based on at least the responses associated with the first subset of the first statements that are associated with the inspirational engagement dimension, wherein the inspirational dimension score is indicative of a level of consumer engagement with the television program in the inspirational engagement dimension; and calculating a trustworthy dimension score using one or more computing devices and based on at least the responses associated with the second subset of the first statements that are associated with the trustworthy engagement dimension, wherein the trustworthy dimension score is indicative of a level of consumer engagement with the television program in the trustworthy engagement dimension.

8. The method of claim 7, further comprising:

calculating a life enhancing dimension score based on at least the responses associated with a subset of the first statements that are associated with a life enhancing engagement dimension that corresponds to a degree to which the media consumers consider the television program to be one or more of enriching and educational, wherein the life enhancing dimension score is indicative of a level of consumer engagement with the television program in the life enhancing engagement dimension.

9. The method of claim 8, further comprising:

determining a total media engagement score based on at least the inspirational engagement score, the trustworthy engagement score, and the life enhancing media engagement score.

10. The method of claim 7, further comprising:

calculating a social interaction dimension score based on at least the responses associated with a subset of the statements associated with a social interaction engagement dimension that corresponds to a degree to which media consumers consider the television program to be one or more of socializing and conversational, wherein the social interaction dimension score is indicative of a level of consumer engagement with the television program in the social interaction engagement dimension.

11. A computing system for determining at least a first dimension score for a media vehicle, the system comprising:

one or more processors;

a data module configured to execute in the one or more processors and to access survey data from respective media consumers, the survey data comprising responses from respective media consumers to a plurality of statements associated with a media vehicle, wherein the media consumer responses indicate respective media consumer views regarding accuracy and/or truthfulness of the respective statements, wherein the media consumer responses to first statements of the plurality of statements are indicative of a level of consumer engagement associated with the media vehicle in a first media engagement dimension of a plurality of media engagement dimensions, the plurality of media engagement dimensions each representative of one or more specific aspects of engagement that media consumers experience with regard to the media vehicle, the media engagement dimensions comprising one or more of an inspirational engagement dimension, a trustworthy engagement dimension, a life enhancing engagement dimension, and a social interaction engagement dimension, wherein the inspirational engagement dimension corresponds to a degree to which media consumers consider respective media vehicles to be one or more of enlightening, ennobling, regenerative, stimulating and uplifting, the trustworthy engagement dimension corresponds to a degree to which media consumers consider respective media vehicles to be one or more of authentic, believable, credible, ethical and honest, the life enhancing engagement dimension corresponds to a degree to which the media consumers consider respective media vehicles to be one or more of enriching and educational, and the social interaction engagement dimension corresponds to a degree to which media consumers consider respective media vehicles to be one or more of socializing and conversational; and a scoring module configured to execute in the one or more processors and to calculate a dimension score for the media vehicle, the dimension score indicating a level of consumer engagement with the media vehicle in the first media engagement dimension, wherein the scoring module selects a subset of the plurality of responses that are associated with the first media engagement dimension, and based on the selected subset of responses, calculates the dimension score.

12. The system of claim 11, wherein subsets of the responses corresponding to different media engagement dimensions are mutually exclusive.

13. The system of claim 11, wherein the data module is further configured to access data associated with a plurality of media vehicles and the scoring module is further configured to calculate a plurality of dimension scores for each of the plurality of media vehicles.

14. The system of claim 13, further comprising:
a report module configured to access the plurality of dimension scores calculated by the scoring module for a selected subset of the plurality of media vehicles and to generate a report indicating associations between dimension scores for each of the selected subset of media vehicles.

15. A non-transitory computer readable medium configured to store software code that is readable by a computing system, wherein the software code is executable on the computing system in order to cause the computing system to perform operations comprising:
receiving an indication of one or more media vehicles, respective media vehicles comprising one or more of a specific television program, a specific magazine, a specific Internet site, a specific radio program, and a specific newspaper;

receiving an indication of multiple media engagement dimensions, the media engagement dimensions each representative of one or more specific aspects of engagement that media consumers experience with regard to the respective media vehicles, the media engagement dimensions comprising one or more of an inspirational engagement dimension, a trustworthy engagement dimension, a life enhancing engagement dimension, and a social interaction engagement dimension, wherein the inspirational engagement dimension corresponds to a degree to which media consumers consider respective media vehicles to be one or more of enlightening, ennobling, regenerative, stimulating and uplifting, the trustworthy engagement dimension corresponds to a degree to which media consumers consider respective media vehicles to be one or more of authentic, believable, credible, ethical and honest, the life enhancing engagement dimension corresponds to a degree to which the media consumers consider respective media vehicles to be one or more of enriching and educational, and the social interaction engagement dimension corresponds to a degree to which media consumers consider respective media vehicles to be one or more of socializing and conversational;

accessing survey data from a plurality of media consumers, the survey data comprising responses from respective media consumers to a plurality of statements regarding at least a first media vehicle of the plurality of media vehicles, wherein the media consumer responses indicate respective media consumer views regarding accuracy and/or truthfulness of respective statements;

accessing a data structure indicating relationships between first statements of the plurality of statements and a first media engagement dimension of the multiple media engagement dimensions, wherein the media consumer responses to the first statements are indicative of a level of consumer engagement in the first media engagement dimension; and calculating a dimension score, using one or more computing devices, for the combination of the first media vehicle in the first media engagement dimension, wherein the dimension score is based on at least the consumer responses to the first statements of the plurality of statements with reference to the first media vehicle, wherein the dimension score is indicative of a level of consumer engagement with the first media vehicle in the first media engagement dimension.

* * * * *